(12) United States Patent
McGovern et al.

(10) Patent No.: US 7,590,807 B2
(45) Date of Patent: Sep. 15, 2009

(54) SYSTEM AND METHOD FOR RECORD RETENTION DATE IN A WRITE ONCE READ MANY STORAGE SYSTEM

(75) Inventors: William P. McGovern, San Jose, CA (US); Jeffrey L. Heller, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 909 days.

(21) Appl. No.: 10/701,373

(22) Filed: Nov. 3, 2003

(65) Prior Publication Data

US 2005/0097260 A1     May 5, 2005

(51) Int. Cl.
*G06F 12/00* (2006.01)
(52) U.S. Cl. .................... 711/159; 711/4; 711/112; 711/156; 711/161; 711/163; 707/204
(58) Field of Classification Search .................. 711/163, 711/161, 156, 112, 4, 159; 707/204
See application file for complete search history.

(56) References Cited

U.S. PATENT DOCUMENTS

| | | | | |
|---|---|---|---|---|
| 4,974,156 | A * | 11/1990 | Harding et al. | 711/162 |
| 5,025,396 | A * | 6/1991 | Parks et al. | 715/506 |
| 5,813,009 | A * | 9/1998 | Johnson et al. | 707/100 |
| 5,831,859 | A * | 11/1998 | Medeiros et al. | 700/218 |
| 6,185,661 | B1 * | 2/2001 | Ofek et al. | 711/145 |
| 6,606,693 | B1 | 8/2003 | Morris | |
| 6,615,330 | B2 * | 9/2003 | Debiez et al. | 711/163 |
| 7,146,388 | B2 * | 12/2006 | Stakutis et al. | 707/204 |
| 7,155,460 | B2 * | 12/2006 | McGovern et al. | 707/200 |
| 2004/0186858 | A1 * | 9/2004 | McGovern et al. | 707/200 |
| 2006/0010150 | A1 * | 1/2006 | Shaath et al. | 707/102 |

OTHER PUBLICATIONS

Microsoft Computer Dictionary, 4$^{th}$ Edition, 1999, p. 486, definition of WORM.*

(Continued)

*Primary Examiner*—Stephen C Elmore
(74) *Attorney, Agent, or Firm*—Cesari and McKenna, LLP

(57) ABSTRACT

This invention provides a specified retention date within a data set that is locked against deletion or modification within a WORM storage implementation. This retention date scheme does not utilize any proprietary application program interfaces (APIs) or protocols, but rather, employs native functionality within conventional file (or other data containers, data sets or block-based logical unit numbers) properties available in commonly used operating systems. In an illustrative embodiment, the retention date/time is calculated by querying the file's last-modified time prior to commit, adding the retention period to this value and thereby deriving a retention date after which the file can be released from WORM. Prior to commit, the computed retention date is stored in the file's "last access time" property/attribute field, or another metadata field that remains permanently associated with the file and that, in being used for retention date, does not interfere with file management in a WORM state. Since this field is not utilized in a WORM context, it can be adapted to store this date. Once stored, the retention date in this field is locked against modification. Where extension (never reduction) of a retention period is desired, the last access time field be updated, wherein the new retention period is added to the existing last access time value to derive a new, later retention date for the file. Upon expiry of the retention date, the system allows deletion of the expired WORM file/data set.

69 Claims, 11 Drawing Sheets

OTHER PUBLICATIONS

IBM Dictionary of Conputing, 10$^{th}$ Edition, 1993, p. 751, definition of WORM.*

IEEE 100, "The Authoritative Dictionary of IEEE Standards Terms," Seventh Edition, Dec. 2000, definition of "data structure."*

Apvrille et al., "A Time Stamped Virtual WORM System," pp. 1-12, Proceedings of the SEcurit\'e des Communications sur Internet Workshop (SECI 2002), Sep. 2002.*

Chris Lueth, "WORM Storage on Magnetic Disks Using SnapLock Compliance and SnapLock Enterprise" TR3263, pp. 1-13, Sep. 2003.*

"Notification of Transmittal of the International Search Report and the Written Opinion of the International Searching Authority, or the Declaration," International Filing Date: Apr. 22, 2004, International Application No. PCT/US2004/12378, Applicant: Network Appliance, Inc., Date of Mailing: Jul. 3, 2008, pp. 1-15.

* cited by examiner

SYSTEM AND METHOD FOR RECORD RETENTION DATE IN A WRITE ONCE READ MANY STORAGE SYSTEM

RELATED APPLICATIONS

This application is related to U.S. Pat. No. 7,155,460, issued on Dec. 26, 2006 entitled WRITE-ONCE-READ-MANY STORAGE SYSTEM AND METHOD FOR IMPLEMENTING THE SAME, by William P. McGovern, et al,. the teachings of which are expressly incorporated herein by reference.

FIELD OF THE INVENTION

This invention relates to data storage systems having write-once-read-many capabilities for enhanced data integrity.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a computer that manages data access and may, in the case of a filer, implement file system semantics, such as the Data ONTAP™ storage operating system, implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof; volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

Data storage is an increasingly crucial and central part of many industries dealing in financial transactions and other sensitive tasks, such as banks, government facilities/contractors, defense, health care institutions, pharmaceutical companies and securities brokerages. In many of these environments, it is necessary to store selected data in an immutable and unalterable manner. This need continues to grow in the light of current concerns over institutional fraud and mismanagement, wherein the temptation on the part of wrongdoers to erase or alter incriminating data is always present. Forms of data that require immutable treatment often include e-mails, financial documents and transaction records, and any other record that may act as proof of an important action or decision. Even in less-critical/unregulated environments, the ability to store a secure unalterable data cache is highly desirable. For example engineering, medical, law and other professional firms may wish to establish a cache of key data (e.g. invention reports or design files, client communications, medical images, etc.), that will remain unaltered and online for long periods on time. These caches can provide reliable references and proofs for clients and other interested parties.

For an example of a highly regulated environment, the United States Securities and Exchange Commission (SEC)—the body that regulates all securities transactions and reporting relative to public corporations—promulgates SEC Rule 17a-4 governing document retention for brokers and investment institutions. This rule requires that these entities store e-mails and other documents in connection with a variety of transactions and trades by clients of the entities unchanged and unchangeable for a number of years and to be able to provide these records to the SEC and other regulators on short notice. Failure to comply with these rules can lead to significant sanctions.

A variety of prior art approaches involving tape drives, electro-optical recordable media and the like have been employed over the years to implement a WORM storage system. Each of these systems has certain drawbacks in terms of storage size, speed maintenance requirements or a combination of these (and other) factors.

In the above-incorporated-by-reference U.S. Pat. No. 7,155,460, issued on Dec. 26, 2006 entitled WRITE-ONCE-READ-MANY STORAGE SYSTEM AND METHOD FOR IMPLEMENTING THE SAME, a particularly advantageous approach to WORM storage is taught, which employs conventional fault-tolerant (e.g. RAID-based) disk storage (or similar rewritable media) as a platform for a WORM storage system. This described system is advantageous in that such disks are large in storage capacity, relatively inexpensive and easily added to an existing storage implementation. However, these disks are also inherently rewritable and/or erasable, in light of existing operating systems and protocols that are typically designed with semantics that specifically enable the free rewriting and erasure of attached disks. The described WORM storage approach is, therefore, specially configured to absolutely prevent alteration of any WORM-designated data. Also, to maintain longevity of the solution and make it available to as many clients as possible, the described WORM implementation utilizes open protocols such as CIFS and NFS and requires minimal alteration to these protocols or the applications that employ them and a minimal footprint on client applications. The system is, thus, organized around WORM storage volumes that contain files, which when committed to WORM storage, cannot be deleted or modified. Any file path or directory tree structure used to identify the file within the WORM volume is locked and cannot be deleted.

In the described WORM system, an administrator creates a WORM volume (or other WORM-designated data organizational structure), capable of storing designated WORM files (or other "data sets"). The client then creates an appropriate WORM file using the appropriate protocol semantics. The file is written to the volume and committed to WORM state by transitioning the file attributes from a not-read-only state to a read-only state. The file system persistently stores the WORM state of a file with the attributes and metadata for the file and uses this persistent WORM state to recognize WORM files on a WORM volume. Henceforth, any attempt to modify the file attributes, write to the file, or delete the file, by clients, administrators or other entities is rejected and a request denied message is returned to the attempting party. Since the file cannot be deleted, conventional file system semantics prevent deletion of the directory path. Likewise, the file system does not permit renaming of directories in an illustrative embodiment to thereby ensure the reliable and immutable identification of WORM files within the directory structure.

Committing of the WORM file to the WORM storage volume can be performed by the client via a command line interface in an interactive manner. Alternatively, applications, which are familiar with the WORM semantics, can be adapted to commit the file using an appropriate application program interface or other programmatic command structure. Similarly, open protocols, such as NFS or CIFS, through which the clients communicate with the file server/file system can be modified to enable automatic commit of created files upon a key event, such as closing of the file. The protocols and file system can be adapted to enable specialized WORM directories within the volume. An appropriate WORM file extension can be provided so that worm files within the volume can be readily identified by the client. Also, selected mirroring and backup functions may be allowed, while other backup functions that enable restoration or reversion of the volume to an earlier point in time may be disabled.

Many regulatory schemes governing WORM data storage (for example SEC 240.17a-4) specify provisions for retention periods, after which the WORM data can be discarded. In the absence of a specified retention period, applied to the record on creation, the regulations generally specify permanent retention. In the case of removable media, such as tapes or electro-optical storage, the media are carefully indexed and stored (often in secure sites) during their retention periods. Upon expiration of an applicable retention date, the expired media is retrieved from storage and physically destroyed. Since disk storage has the inherent ability to be rewritten and reused when a particular record is no longer needed, it is contemplated that the WORM protection on various on-disk records may carry a retention date, and when the retention date passes, the expired WORM record and associated data may be erased, thus preserving storage resources and ensuring the orderly and predictable removal of expired WORM data—without the material waste evoked by physical media destruction.

One commercially available WORM storage system marketed under the tradename Centera from EMC Corp. of Hopkinton, Mass. enables basic forms of retention dates for record storage. The system utilizes a network-connected cluster of general-purpose computer systems running a customized variant of the Linux operating system. A proprietary application programming interface (API) and proprietary protocols for interfacing with the storage system, as opposed to the open protocol and open standardized API approach is implemented by these computers. As such, applications can only access the storage and manipulate records through proprietary mechanisms or through a "gateway" interposed between the users and the storage system, which translates an open protocol to the proprietary protocols supported by the storage system.

This form of WORM storage system utilizes, so-called "Content Addressable Storage," (CAS) for management of stored records. CAS relies on computing digital signatures, using an algorithm such as an MD5 hash, of the contents of any WORM-stored records to create a unique key (of "content address") for each and every record. A representation of the digital signature of a record is used as the "key," or "content address," with which any future reference to the stored object must be made. This is often described as similar to a "claim check" system whereby the storage system generates a unique key for every object stored, which it returns to the application. The application is responsible for management and preservation of these content addresses, which must be performed external to the storage system.

To associate retention information with a stored record, the proprietary API permits metadata, in a proprietary format, to be associated with a stored object. This metadata information can include retention information for the record. The API supports the ability to extend retention dates further into the future, and in certain configurations, to assign an infinite retention date to those records submitted without retention information. Because of the CAS architecture, every object written to the system, as long as it has unique contents, is stored as a unique object with a unique content address. To enable WORM functionality the API prevents deletion of objects prior to the expiration of their associated retention period. Modification of existing objects is impossible because any changes in the contents of an object will result in a new content address, and hence a new object being created in the storage system.

To track retention time and other time-dependent functions, this system is believed to simply draw time values from the system hardware clocks within the nodes (computers) of the cluster for time reference and rely on the physical security of the system to prevent tampering.

SUMMARY OF THE INVENTION

This invention overcomes the disadvantages of the prior art by providing a specified retention date within a data set that is locked against deletion or modification within a WORM storage implementation. This retention date scheme does not utilize any proprietary application program interfaces (APIs) or protocols, but rather, employs native functionality within conventional file (or other data containers, data sets or block-based logical unit numbers) properties available in commonly used operating systems. In an illustrative embodiment, the retention date/time is calculated by querying the file's last-modified time prior to commit, adding the retention period to this value and thereby deriving a retention date after which the file can be released from WORM. Prior to commit, the computed retention date is stored in the file's "last access time" property/attribute field, or another metadata field (typically open protocol-based) that remains permanently associated with the file and that, in being used for retention date, does not interfere with file management in a WORM state. Since this field is non-essential and rarely utilized in a WORM context, it can be adapted to store this date. Once stored, the retention date in this field is locked against modification. Where extension (never reduction) of a retention period is desired, the last access time field be updated, wherein the retention period extension is added to the existing last access time value to derive a new, later retention date for the file. Upon expiry of the retention date, the system allows deletion of the expired WORM file/data set.

The procedure checks whether the retention date provided by the administrator, user or interface is allowed by a particular set of WORM rules governing a volume. To this end, there may be more than one set of WORM rules applicable to a storage system. For storage requiring strict (government regulatory, for example) compliance, a strict or regulatory WORM volume may be employed. Storage in this volume is subjected to strict minimum default retention periods or, in the absence of a specified period, infinite periods. No modification or deletion of files is permitted until an applicable retention date expires. Conversely an "enterprise" volume, defined under a trusted administrator model may permit flexible setting of retention dates and/or no date as a default. Likewise, enterprise volumes may enable restoration from an earlier image of the file/volume, or destruction of a volume where appropriate.

In an illustrative embodiment, a secure compliance clock is used to gauge the time relative to the retention period. In one embodiment, this clock uses a trusted timebase, such as a repetitive file server process to derive its time value. The clock is tamper-proof, and its time value is guaranteed to be no sooner that actual time, but may be slightly longer to further ensure observance of the full retention period. In other embodiments, the clock can be based upon a trusted third-party clock (such as a government-based clock) or an additional secure hardware-based clock.

The stored retention date/time can overcome certain limitations in bit range for older open protocols by providing a base time date (epoch) that is relatively contemporary with the present day. The available date range under such bit range limitations can be extended generally by redefining the epoch (base time) to which the time value is relative. The identical format is used for dates within the epoch while wrap-around encoding of the date (e.g. using dates before the epoch as an extended range) for values appearing within the extended date range.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network and File Server Environment

Figure 1:
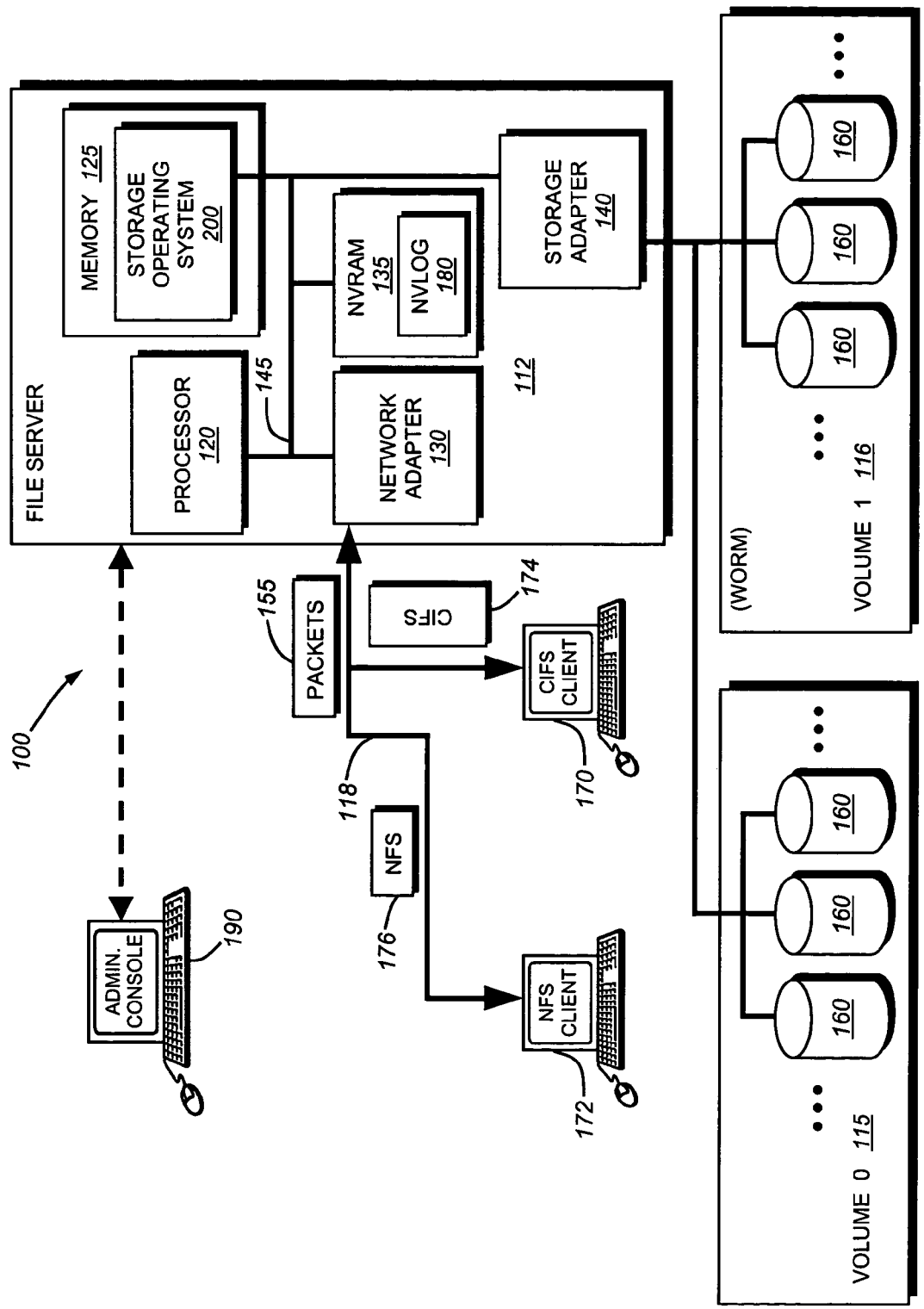
FIG. 1 is a schematic block diagram defining an exemplary network and file server environment including a file server and associated clients within which the principles of this invention are implemented.

By way of further background, FIG. 1 is a schematic block diagram of a storage system environment 100 that includes a file server 112 that may be advantageously used with the present invention. For the purposes of this description, the source system is a networked computer that manages storage of one or more storage disks 160 (can't find 162 in FIG. 1).

The file server or "filer" 112 manages one or more volumes 115 and 116, comprising arrays of disks 160. The filer 112 is linked to a network 118 that can comprise a local or wide area network, such as the well-known Internet. An appropriate network adapter 130 facilitates communication over the network 118. The filer 112 generally comprises a processor 120, a memory 125, a network adapter 130 and a storage adapter 140 interconnected by a system bus 145. Filer 112 also includes a storage operating system 200 (FIG. 2) that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, the filer 112 can be broadly, and alternatively, referred to as a storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 125 comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The storage operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 130 comprises the mechanical, electrical and signaling circuitry needed to connect the filer 112 to the network 118, which may comprise a point-to-point connection or a shared medium, such as a local area network. A client (170, 172) may interact with the destination filer 112 in accordance with a client/server model of information delivery. That is, the client may request the services of the filer, and the filer may return the results of the services requested by clients 170 and 172 by exchanging packets 155 encapsulating, e.g., the TCP/IP protocol or another network protocol (CIFS 174 and NFS 176, respectively) format over the network 118.

The storage adapter 140 cooperates with the operating system 200 (FIG. 2) executing on the filer 112 to access information requested by the client. The information may be stored on the disks 160 that are attached, via the storage adapter 140 to the filer 112 or other node of a storage system as defined herein. The storage adapter 140 includes input/output (I/O) interface circuitry that couples to the disks over an I/O interconnect arrangement, such as a conventional high-performance, Fibre Channel serial link topology. The information is retrieved by the storage adapter and processed by the processor 120 as part of the snapshot procedure, to be described below, prior to being forwarded over the system bus 145 to the network adapter 130, where the information is formatted into packets and transmitted to the destination server as also described in detail below.

The filer may also be interconnected with one or more clients 170 via the network adapter 130. The clients transmit requests for file service to the filer 112 respectively, and receive responses to the requests over a LAN or other network (118). Data is transferred between the client 170, 172 and the filer 112 using respective data packets defined as an encapsulation of the Common Internet File System (CIFS) protocol (174) or another appropriate protocol, such as NFS (176).

In one exemplary filer implementation, the filer 112 can include a nonvolatile random access memory (NVRAM) 135 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

An administrator's console 190 is also provided in an illustrative embodiment for controlling various file server functions and operations. The console 190 can be a client or terminal connected via a dedicated port to the file server, or it can be networked via the network link 118, and reside at a remote location—potentially a long-distance away from the file server. Certain commands, to be described below, are entered through the console in an illustrative embodiment.

In an illustrative embodiment, the disks 160 are arranged into a plurality of volumes, by way of example termed Volume 0 (115) and Volume 1 (116), in which each volume has a file system associated therewith. The volumes 115, 116 each include one or more disks 160. In one embodiment, the physical disks 160 are configured into RAID groups. In one embodiment this organization is arranged so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume. As will be described below, Volume 0 (115) is a regular storage volume with full read and write access while Volume 1 (116) is a write-once-read-many (WORM) volume in which selected files cannot be modified, erased or otherwise deleted once they are committed to storage.

B. Storage Operating System

To facilitate generalized access to the disks 160, the storage operating system 200 (FIG. 2) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which references to other files and directories are stored. As noted and defined above, in the illustrative embodiment described herein, the storage operating system is the NetApp® Data ONTAP™ operating system available from Network Appliance, Inc., of Sunnyvale, Calif. that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Figure 2:
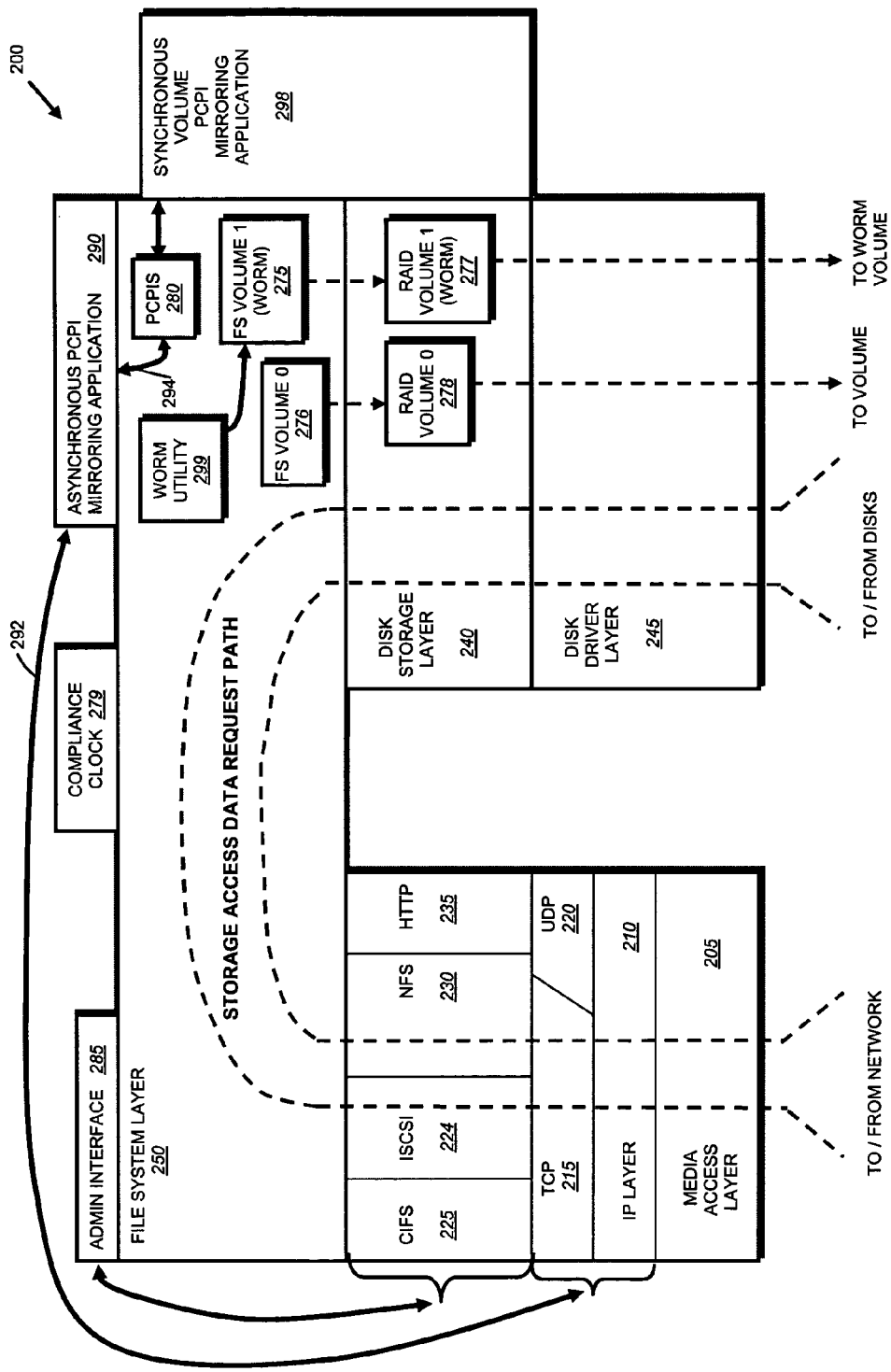
FIG. 2 is a schematic block diagram of an exemplary storage operating system in accordance with an illustrative embodiment of the present invention.

The organization of the preferred storage operating system for each of the exemplary filers is now described briefly. However, it is expressly contemplated that the principles of this invention can be implemented using a variety of alternate storage operating system architectures. As shown in FIG. 2, the exemplary storage operating system 200 comprises a series of software layers, including a media access layer 205 of network drivers (e.g., an Ethernet driver). The operating system further includes network protocol layers, such as the Internet Protocol (IP) layer 210 and its supporting transport mechanisms, the Transport Control Protocol (TCP) layer 215 and the User Datagram Protocol (UDP) layer 220. A file system protocol layer provides multi-protocol data access and, to that end, includes support for the CIFS protocol 225, the iSCSI protocol 224, the NFS protocol 230, the Hypertext Transfer Protocol (HTTP) protocol 235 and other protocols (not shown) that may be open or proprietary in format, such as NFS version 4, etc. In addition, the storage operating system 200 includes a disk storage layer 240 that implements a disk storage protocol, such as a RAID protocol, and a disk driver layer 245, that implements a disk control protocol such as the small computer system interface (SCSI).

Bridging the disk software layers with the network and file system protocol layers is a file system layer 250 of the storage operating system 200. Generally, the file system layer 250 implements a file system having an on-disk format representation that is block-based using, e.g., 4-kilobyte (KB) data blocks and using inodes or another data structure to describe the files. Note that while files are implemented in an illustrative embodiment, the term "file" or "files" should be taken broadly to include any type of data organization or "data container" including those used by block-level protocols such as SCSI. The term "data container" will therefore be used interchangeably herein.

In response to transaction requests, the file system generates operations to load (retrieve) the requested data from volumes if it is not resident "in-core", i.e., in the filer's memory 225. If the information is not in memory, the file system layer 250 indexes into the inode file using the inode number to access an appropriate entry and retrieve a volume block number. The file system layer 250 then passes the volume block number to the disk storage (RAID) layer 240, which maps that volume block number to a disk block number and sends the latter to an appropriate driver (for example, an encapsulation of SCSI implemented on a fibre channel disk interconnection) of the disk driver layer 245. The disk driver accesses the disk block number from volumes and loads the requested data in memory 125 for processing by the filer 112 (see FIG. 1). Upon completion of the request, the filer (and storage operating system) returns a reply, e.g., a conventional acknowledgement packet defined by the CIFS specification, to the client 170 over the respective network connection 172.

It should be noted that the software "path" 270 through the storage operating system layers described above needed to perform data storage access for the client request received at the filer may alternatively be implemented in hardware or a combination of hardware and software. That is, in an alternate embodiment of the invention, the storage access request data path 270 may be implemented as logic circuitry embodied within a field programmable gate array (FPGA) or an application specific integrated circuit (ASIC). This type of hardware implementation increases the performance of the file service provided by the filer 112 in response to a file system request packet issued by the client 170.

Before continuing with the detailed description of the figures, a brief discussion of backups is appropriate. In order to improve reliability and facilitate disaster recovery in the event of a failure of a filer, its associated disks or some portion of the storage infrastructure, it is common to "mirror" or replicate some or all of the underlying data and/or the file system that organizes the data. In one example, a mirror is established and stored at a remote site, making it more likely that recovery is possible in the event of a true disaster that may physically damage the main storage location or its infrastructure (e.g. a flood, power outage, act of war, etc.). The mirror is updated at regular intervals, typically set by an administrator, in an effort to catch the most recent changes to the file system.

One common form of update involves the use of a "snapshot" process in which the active file system at the storage site, consisting of inodes and blocks, is captured and the "snapshot" is transmitted as a whole, over a network (such as the well-known Internet) to the remote storage site. Generally, a snapshot is an image (typically read-only) of a file system at a point in time, which is stored on the same primary storage device as is the active file system and is accessible by users of the active file system. By "active file system" it is meant the file system to which current input/output operations are being directed. The primary storage device, e.g., a set of disks, stores the active file system, while a secondary storage, e.g., a tape drive, may be utilized to store backups of the active file system. Once the snapshot is taken (i.e., the image captured), the active file system is reestablished, leaving the snapshotted version in place for possible disaster recovery. Each time a snapshot is taken, the old active file system becomes the new snapshot, and the new active file system carries on, recording any new changes. A set number of snapshots may be retained depending upon various time-based and other criteria.

"Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other unique identifier that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights.

A PCPI/snapshotting process is described in further detail in U.S. patent application Ser. No. 09/932,578, entitled INSTANT SNAPSHOT by Blake Lewis et al., which is hereby incorporated by reference as though fully set forth herein. In addition, the native Snapshot™ capabilities of the WAFL file system are further described in *TR3002 File System Design for an NFS File Server Appliance* by David Hitz et al., published by Network Appliance, Inc., and in commonly owned U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference.

With renewed reference to FIG. 2, overlying the file system layer 250 is the user interface 285 for the administrator. This can be accessed via the various protocols (CIFS, NFS, etc.) described above.

Also, overlying the file system layer 250 is a specialized asynchronous volume and sub-volume (or "qtree") snapshot mirroring (or replication) application 290. This application is responsible for the generation of the mirrors at a remote destination storage volume based upon changes in snapshots at the source. The snapshot mirroring application 290 operates outside of the storage access request path 270, as shown by the direct links 292 and 294 to the TCP/IP layers 215, 210 and the file system snapshot mechanism (280). This application enables "asynchronous" mirroring of changes in the respective sub-volume. That is mirroring is written incrementally (and not in real-time with respect to changes occurring on the source sub-volume) to a destination store that can be remote and linked by a network connection. A discussion of asynchronous mirroring at a volume and sub-volume (or q-tree) level is found in U.S. Pat. No. 6,993,539, issued on Jan. 31, 2006, entitled SYSTEM AND METHOD FORT DETERMINING CHANGES IN TWO SNAPSHOTS AND FOR TRANSMITTING CHANGES TO A DESTINATION SNAPSHOT by Michael L. Federwisch, et al., which is hereby incorporated by reference.

Likewise a synchronous volume snapshot mirroring application 298 acting on the RAID layer is provided. This application provides synchronous (real-time) mirroring to a mirror store in response to a mirror command initiated by an administrator. This mirroring creates a point-in-time image of the source that copies it as it existed at the time the mirror command is acted upon. Approaches to volume-based remote mirroring of snapshots are described in detail in commonly owned U.S. Pat. No. 6,604,118, issued on Aug. 5, 2003, entitled FILE SYSTEM IMAGE TRANSFER by Steven Kleiman, et al. and U.S. Pat. No. 6,574,591, issued on Jun. 3, 2003, entitled FILE SYSTEM IMAGE TRANSFER BETWEEN DISSIMILAR FILE SYSTEMS by Steven Kleiman, et al., both of which patents are expressly incorporated herein by reference.

Notably, the storage operating system includes a WORM utility 299 that resides generally in the file system layer 250. As will be described in detail below, this WORM utility is responsible for establishing specialized worn volumes 275 in the file system that are differentiated from conventional file system volumes 276. These volumes are carried respectively into the RAID layer as corresponding, differentiated WORM and non-WORM RAID volumes 277 and 278, respectively. Moreover, this utility is responsible for establish WORM files or like "WORM data containers" (e.g. clocks, etc.) within a WORM volume that are non-rewritable and non-erasable/deletable. By action of the utility 299, the respective directory pathways (or other identifying logical organization) of any WORM files/data containers are, likewise locked against deletion so long as a WORM file resides in the path/tree.

In accordance with an illustrative embodiment, the storage operating system 200 also includes a secure compliance clock 279 that, in an illustrative embodiment, is a software-based clock used in connection with the setting, tracking and enforcement of retention periods on WORM files as described in detail below. Alternatively, the compliance clock can be implemented as a further hardware-based clock or a feed from a trusted third party (government-based, for example) clock. As described in detail below, all embodiments of a compliance clock can include mechanisms to thwart tampering and ensure reliability of the output time value.

Before proceeding with a more detailed description of the illustrative embodiment, the following definitions are provided. The term "data set" or "data container," as noted above, shall refer generally to a file, LUN (logical unit number), or any other separately or individually addressable data structure. The term "volume" shall refer to a logical group of data containers. The term "directory" shall refer to an organizational structure that facilitates access of a given data container through traversal of trees or another logical indexing structure. Likewise the term "pathway" or "path" shall refer to the route taken by the storage operating system through the directory structure in addressing the data container. In addition, it is expressly contemplated that the teachings of this invention can be applies to a variety of storage environments and data types including, but not limited to, file data, database data, block-level data, etc..

C. WORM Volume Creation

Figure 3:
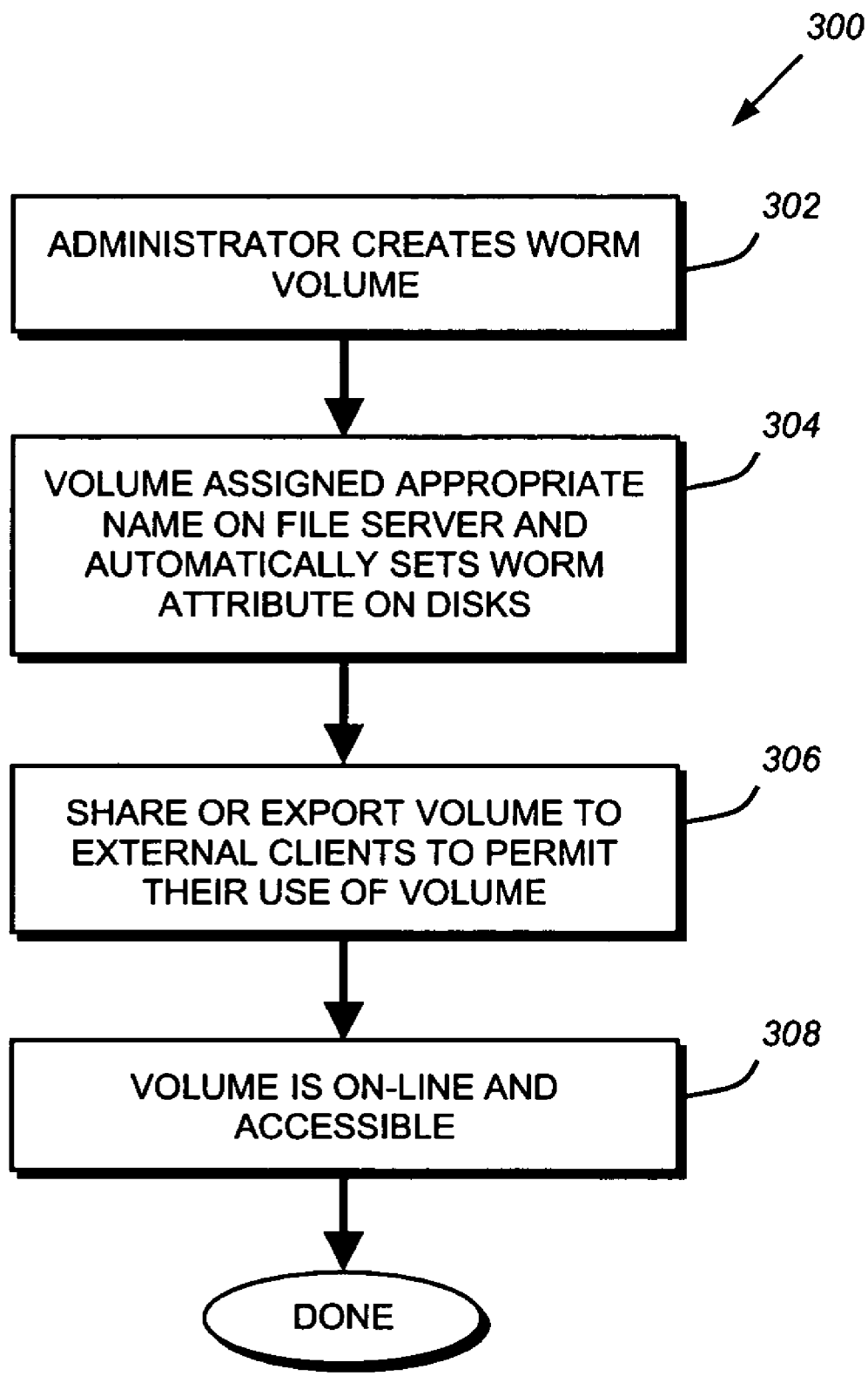
FIG. 3 is a flow diagram of a WORM volume creation procedure according to an illustrative embodiment of the present invention.

With reference to the flowchart in FIG. 3, a generalized procedure 300 for creating a WORM volume and the results of its creation is described. This procedure is implemented typically by the administrator using the administrative console and interface to input the appropriate volume create command. The file system is modified to recognize a new semantic relative to the conventional (pre-WORM) volume create command that designates a WORM volume. In step 302 the administrator initially creates the WORM volume having some general parameters such as for size in terms of number of disks. In one embodiment this is accomplished by typing in the following exemplary command including the volume name "volname" and the "-L", the number of disks:

vol create<volname>-L<number of disks>.

Next, in step 304, the volume is assigned the requested name (volname) on the file server. As such, it is identified as /vol/volname. The disks that are associated with the volume are marked with a WORM attribute on their RAID labels in persistent storage so that they are identified as WORM volumes. This may require a modification of the conventional RAID layer structure to account for this added label. While WORM is enforced primarily at the file system layer, this tag serves both to identify the assigned disk as a WORM store. Here, the WORM designation is stored in non-volatile memory in the persistent label of a WORM disk. The label contains identification information regarding the disk that permits the storage operating system to map the disk to particular volumes, and is stored in a standardized location on the disks (for example, the beginning). In this manner, the WORM designation is maintained on the disk itself containing the WORM file. Additionally, the WORM designation can be stored in NVRAM or other persistent/battery-backup memory structures and to prevent the inadvertent or deliberate destruction of the volume as discussed further below. Note that step 304 does not require user interaction as the volume name is assigned as part of the creation process for WORM volumes. This can be handled internally by the system.

In step 306, the volume is then exported (for NFS clients) or shared (for CIFS clients) or otherwise made available for use by outside clients. The export/share step is a conventional process that gives appropriate use permissions to clients. In the example of an NFS client the simplified syntax of a suitable command is:

exporfs[-o options]/vol/volname

Likewise in the example of a CIFS client, the syntax is:

cifs shares-add<sharename>/vol/volume

Exports and shares may include appropriate access controls and privileges to clients so that only certain users may access the volume. Permissions are also entered. These generally control what can be done on and to the volume (aside from WORM) functionality. For example it is possible to create a read-only volume, but this would limit future writing to the volume. For example, in contradistinction to a Microsoft Office environment in which in which a user can revoke or release read-only status, the WORM status is not revocable under any circumstance by a user, administrator or other so as to maintain the integrity of the WORM data.

Finally, in step 308, the WORM volume is now on-line and accessible by clients. The WORM functionality is in operation and in force, and the restrictions it imposes are present. In one embodiment these restrictions can include:

1. WORM disables the volume destroy command—in an illustrative embodiment WORM volume destruction permitted so that a WORM volume is immutable. However, it is contemplated that, in the presence of retention dates, described below, that the volume may be subject to destruction after all retention periods residing on the volume have expired.

2. WORM disables conventional restoration of WORM volume or parts thereof from a snapshot—prevents improper reconstruction from an earlier point-in-time image that obliterates later modifications to files and WORM files committed after the point-in-time.

It should be noted that the WORM principles described herein can apply in at least two different scenarios, a more strict scenario in which the administrator is untrusted (a government-regulated scenario) and one established upon the trusted administrator or "enterprise" model. In the case of an enterprise model, specific enterprise WORM volumes may be provided where flexibility exists to perform certain actions prohibited under the stricter model (in stricter-regulated volumes). For example, files enterprise volumes may be subject to restoration from a PCPI, destruction of a volume and flexibility in setting minimum retention periods.

3. Permissions (Set Attributes command "SETATTR" in NFS) (Set File Information "TRANS2_SET_FILE_INFORMATION" command in CIFS) require that any file (or data container) within the volume be a WORM file if it is set to "read-only" from an initial not-read-only state—the file system layer distills all permissions from their respective protocols to cause WORM state to be assigned to files which undergo this not-read-only to read-only transition.

4. Any WORM file modifications (e.g. write, rename, delete (subject to retention dates, below),file attribute change, etc.) within the volume that modify the state of the file, including attempted modification of date stamps, read-only status, etc. are restricted. If file access/modification is requested the file system first checks the WORM state of the volume and then the target file's individual WORM state (described below) is checked before modification is permitted. If the file is WORM, then the modification is restricted, and the file server returns an appropriate file error message such as "read-only" or "access-denied" denying the modification request. As will be described below, with reference to the creation and handling of WORM file of retention dates, the setting of a retention date employs the last access time property field, which is set prior to commit. This set value is used to track retention periods for particular files. Upon expiration, other properties, such as deletion of the particular expired file, may be unlocked, allowing limited access for this purpose.

More specifically, in an exemplary CIFS environment, conventional file attributes can include: the hidden file flag, read-only flag, archive flag (set before backup performed but after writing to file), creation timestamp, modification timestamp, access timestamp, access control lists (ACLs) and NT streams. These attributes are typically locked against modification where such modification may allow improper changes to a file.

In the NFS example, conventional file attributes that are locked can include access control and other permissions related to the file owner, group, etc. NFSv4 has many similar attributes to be locked to those in CIFS described above.

5. Directory renaming is not permitted in a WORM volume in one embodiment. This prevents the directory from being altered to potentially misplace a WORM file. It is contemplated, in an alternate embodiment, that directory renaming is allowed as long as the renaming does not misplace any WORM files, however, in many instances, the basic rule of preventing directory renaming in a WORM volume reduces overhead and increases performance by eliminating the need to check for the displacement of any WORM files in a directory tree whenever a directory renaming command is entered.

Figure 4:
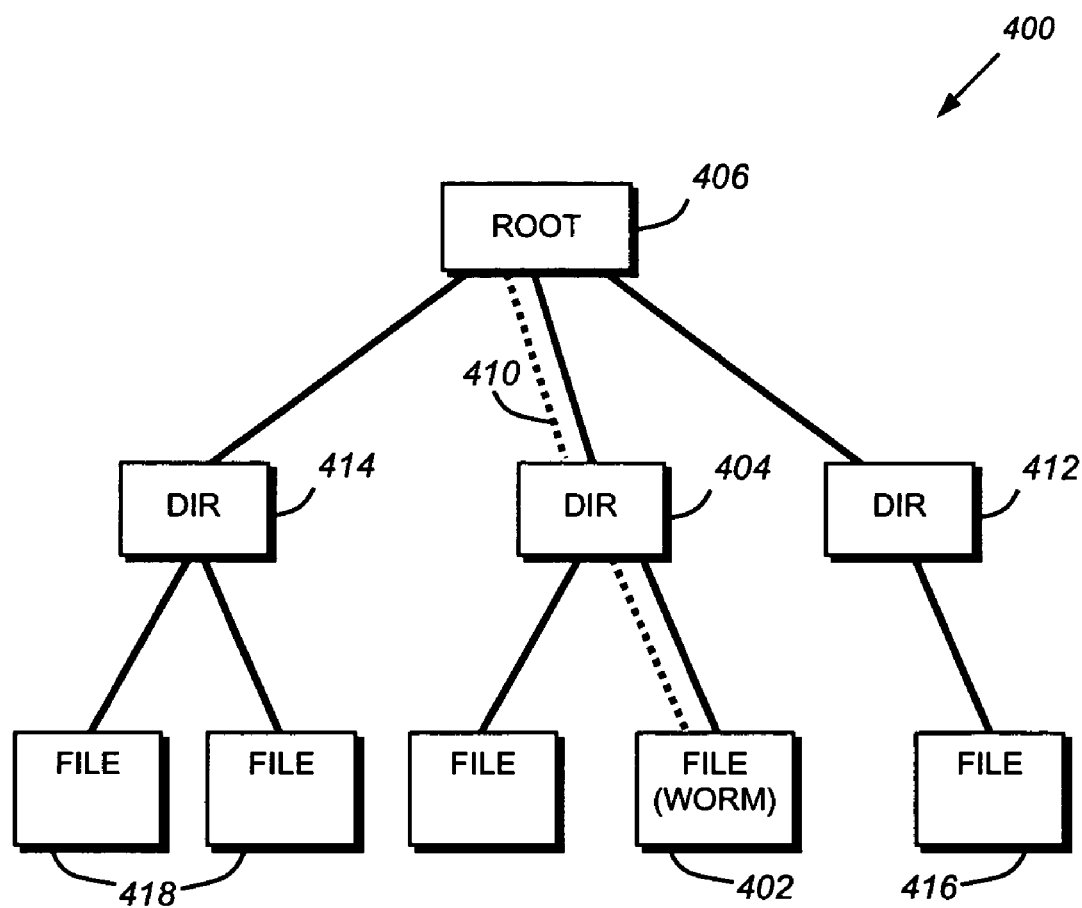
FIG. 4 is a schematic diagram of a directory tree showing an exemplary WORM file pathway.

6. Directory deletion is not permitted where a WORM file is present. As shown generally in FIG. 4, the committing of a WORM file 402 to a directory tree 400 of a WORM volume makes it immutable and not subject to deletion or modification. Accordingly, its directory 404 and root (as well as any subdirectories along its path 410) cannot be deleted in accordance with conventional file system semantics. In other words, if at least one undeleted file remains, the overlying directories cannot be deleted according to accepted file system rules in virtually all file systems. Where such a file system does not explicitly call for this rule, the file system should be overtly modified to restrict WORM filepath deletions. Other non-WORM directories 412 and 414 and their respective files 416 and 418 may be deleted normally according to this embodiment. Note that expiration of the retention period of all files in a given tree enables deletion of these files as described hereinbelow. When all WORM files in a tree are deleted, this thereby enables deletion of the directory as a whole. Alternatively, the operating system may be adapted to recognize expiration of all WORM files in a particular directory, thereby unlocking overall deletion of that directory.

D. Worm File Creation

Once a WORM volume is created by the administrator as described above, it is available for use by permitted clients. The WORM volume allows all conventional volume operations on non-WORM files and directories (e.g. create directories and files, write to files and delete directories and files) subject to the general restrictions above. In addition, the volume allows the one-time writing of WORM files and the reading or copying of WORM files. WORM files are specialized files (or data sets/data containers) within the overall WORM volume. In other words, not all files within a volume are necessarily WORM files. WORM files are created by client and file server applications where needed to store or archive information that must remain immutable. One such application may be an e-mail archive program that gathers desired e-mail records on a continuous or periodic basis and stores the records in an archive file.

Figure 5:
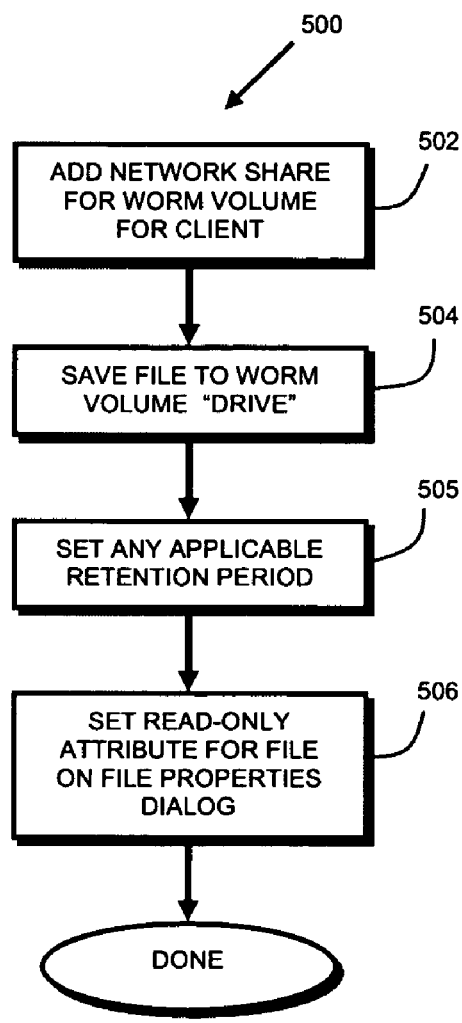
FIG. 5 is a flow diagram of a WORM file creation and commit procedure for a Windows® client according to an illustrative embodiment of the present invention.

In the example of a client running the well-known Windows® operating system (available from Microsoft Corporation of Redmond, Wash.), the procedure 500 for creation of a file and its commitment to WORM is shown in FIG. 5. First, in step 502 the client adds a network share for the WORM volume into which a WORM file is to be stored. In one example, this volume can be named "drive W." This drive then appears in the list of shared drives shown to the client. Next, in step 504 the file is saved to the WORM drive W using standard Windows commands. Once the WORM file is saved or copied onto the appropriate WORM volume, the user is allowed to enter a relevant retention period (step 505). The process for entering and handling such retention periods is described in detail below. In general, entry of retention dates into the appropriate attribute of the file is carried out either programmatically using a standard Windows application program interface (API) by the client application that handles storage of the file, or using an available, non-Windows command line utility capable of setting the attribute for the file. Finally, in step 506 the client calls up the "file properties" dialog and sets the read-only attribute for the WORM file on drive W. The file server's file system recognizes the transition of the file from not-read-only to read-only state and thenceforth designates the file as WORM and all the above restrictions or modification, changes in attribute, etc. are enforced. Significantly, any subsequent attempt by the client to modify the read-only state of the file is denied, and a permission denied message is returned to the client from the file server. In this manner, the final step 506 is termed the "commit" of the file to WORM state. For any protocol, the commit step is needed to imbue the file with WORM characteristics.

It should be noted that, in the illustrative embodiment, the commit process is dependent not simply upon the storage of a read-only file in a WORM volume, but rather the transition of the file within the WORM volume from a not-read-only state to a read-only state. Copy utilities and other file-creating applications that do not transition the file to read-only from a not-read-only state may not render a file as WORM.

While the commit process according to an illustrative embodiment involves the transition of a file attribute from a not-read-only to a read-only state, it is contemplated that other transitions of other conventional attributes (such as the renaming of a file to a WORM file-type) or setting of other specialized attributes or metadata can be used to trigger commit. Alternatively, the storage of the data or file (or movement thereof) into a WORM-designated portion or structure of storage (such as a WORM directory) could act as the trigger for commit.

Figure 6:
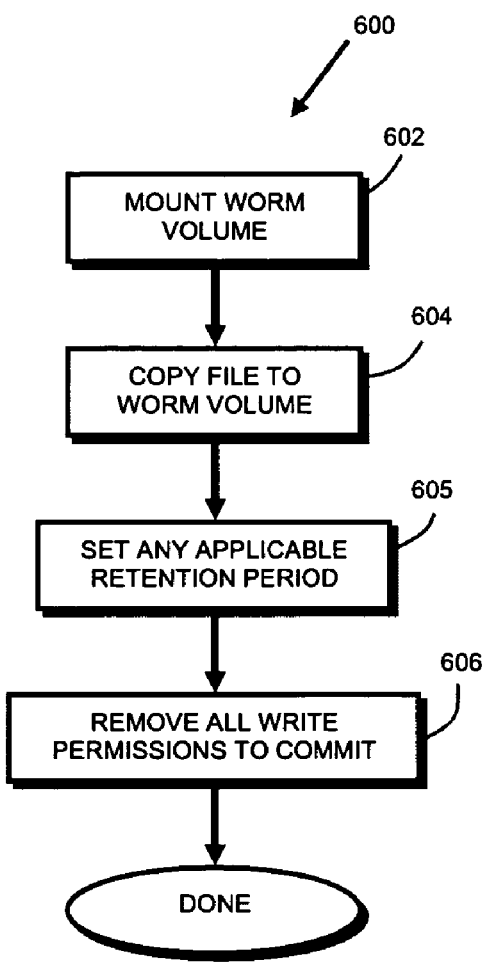
FIG. 6 is a flow diagram of a WORM file creation and commit procedure for a Unix® client according to an illustrative embodiment of the present invention.

In the example of a client running the well-known Unix® operating system, connected to the file server via NFS, the procedure 600 in FIG. 6 outlines the associated WORM file creation and commitment steps. First, in step 602 the WORM volume is mounted using conventional volume-mounting procedures. The exemplary command "mount filer:/vol/volname /worm" can be used. Give an exemplary not-read-only file, file.txt to be WORM-stored, the file is then copied (step 604), and the typical command line shell command would be:

cp file.txt/worm.

This copies the file to the volume as a designated worm file. Once the WORM file is saved or copied onto the appropriate WORM volume, the user is allowed to enter a relevant retention period (step 605). The process for entering and handling such retention periods is described in detail below. After the WORM file is copied and any retention period is set, it must then be committed to WORM in accordance with step 606. Note that the retention period can be set interactively in a Unix system environment by the "touch" command with appropriate options to set the file attribute. A variety of available "touch" utilities, running n a Windows or other platform, can be used to set the attribute. In the example of setting the last access time attribute, the exemplary command is:

touch-a-t<date><file>.

Commit is then accomplished by removing all write permissions from all owners, groups and users, thereby transitioning the file from a not-read-only to read-only state, and hence, WORM. The shell exemplary command for removal of permissions would be:

chmod-w/worm/file.txt.

In a conventional DOS shell, the commit is simply the expression:

ATTRIB+R<filename>.

Each of the above command line expressions are specifically used in interactive sessions at the client. In other words, the client user physically enters the command and awaits the appropriate response from the file server. These create and commit procedures can be carried out internally within a program application as well. Each well-known operating system (Windows, Unix, etc.) supports application-based commit and attribute-change functions. The following function calls would be incorporated in application programs to implement WORM. Note that other modifications to applications to recognize the WORM existence (such as changes to graphical user interfaces for the application) may also be required to fully implement WORM functionality. Also, it is contemplated that WORM volumes are used only with applications that recognize and can employ a WORM volume's special properties and modified semantics. By way of example, the following is a Windows-based C++ (Win32) application program interface function call for commit to WORM (e.g. to set "read-only"):

SetFileAttributes(<file>,FILE_ATTRIBUTE_REA-
DONLY)

Likewise, for Unix-based systems, the application function call would be:

fchmod(<file>,0444)

As should be clear from the above description, the creation of WORM volumes as well as the storage of WORM files (data containers) according to this embodiment requires minimal alteration to the open protocols (CIFS, NFS, etc.), and similarly, minimal alteration of specific applications using the WORM functionality. This is because the majority of new functionality is contained within the file system layer, and that file system layer is adapted to recognize simple modifications to volume-create commands and preexisting file attribute transitions (i.e. not-read-only to read-only) to implement WORM within the file system layer. In addition, since the file system layer is largely independent the various open protocols and passes the information on to the storage layer with uniform WORM characteristics, minimal modifications must be made at the storage layer or other layers within the storage operating system.

It is contemplated that an automatic commit function can be incorporated into the open protocols according to an alternate embodiment. In particular, due to the stateful nature of CIFS, a procedure can be implemented that causes a commit to WORM upon closing of a created WORM file. That is, the protocol recognizes the worm create dialog and proceeds with a commit (e.g. not-read-only to read-only attribute change) when the file is closed. This is more challenging in a stateless protocol such as NFS. However, NFSv4 supports a number of stateful operations and may provide a ready platform for automatic commit like CIFS. Other protocols may also be provided with automatic commit upon file closure.

In another alternate embodiment, it is contemplated that further modifications can be made to the open protocols to accommodate a WORM-directory. In one implementation, only WORM files may have access to the worm directory. To this end, a ".worm" file extension is provided so as to allow a user to view all files having a worm commit. An advantage to committing an entire directory atomically, in one transaction, is that it limits problems resulting from a partial commit of files that may be followed by a crash or other interruption before the remaining files are committed. There may arise inconsistencies as result of the partial commit when the later files are finally committed. In yet another alternate embodiment, any section of a file can be written only once. Thus, an automatic commit mechanism can be employed, which would allow data to be appended to an existing file or to fill any "holes" in the file, but would disallow attempted modifications to the existing written data in the file. Such a so called "incremental WORM commit" lends itself to applications like a WORM log file in which existing records in the file are WORM, but new records may be appended to the file end in the "unwritten" space.

It is also contemplated that WORM volume activity, such as volume creation and volume destruction (if permitted), WORM file writes, etc. can be detected and logged to the administrator via the Simple Network Management Protocol (SNMP). The filer can include a log or maintenance file and SNMP can use traps to detect this activity. In this manner a log of all WORM activity can be maintained, further facilitating data integrity and maintenance and audit of data access, e.g., for law enforcement or internal security purposes.

E. Mirroring and Replication Considerations

Figure 7:
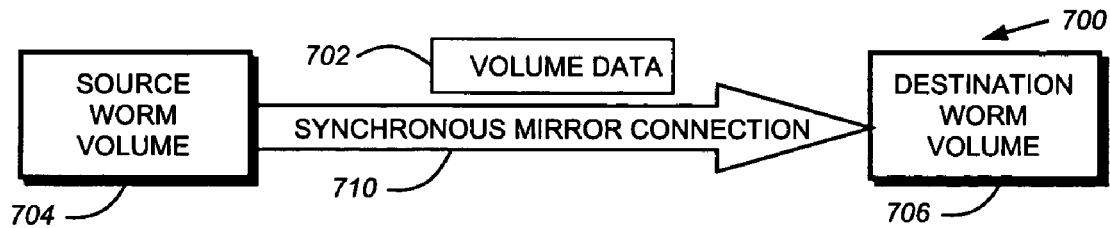
FIG. 7 is a schematic diagram of a synchronous mirroring procedure according to an illustrative embodiment of the present invention.

As described briefly above, certain snapshot restoration functions may need to be disabled. By way of background, FIG. 7 details a synchronous mirroring procedure 700 in which WORM volume data 702 is transmitted to a destination volume 706 in real-time as it is created and stored on the source WORM volume 704. The transmission generally occurs over a high-speed link 710 using a transport protocol (Fibre Channel, iSCSI, etc.) capable of supporting a high-speed, real-time data transfer from source to destination. In essence, the mirror is another disk array, being filled at the same time as the source. Hence, whatever enters the source volume, also enters the mirror destination volume. Since the majority of the mirror function is handled at the storage (RAID) layer, little intervention from the higher level file system on the source is needed.

Before the destination volume is used, it is first created on the destination storage system. In one embodiment, a mirror volume, or other structure, is automatically created via the RAID level in the same filer or file server as the source. It transfers all the WORM functionality from the source to the destination in this instance. Creation of the destination volume is typically accomplished by act of an administrator using an appropriate volume create command. Typically, the destination volume is created as a WORM volume, requiring that the backup storage system, upon which the destination volume resides, have a file system that includes the WORM functionality. By using a WORM mirror volume, the integrity of the stored data is further protected and it complies with the general requirements for secure backup storage. It is possible and may sometimes be desirable to establish a non-WORM destination volume, but such a volume may violate rules for secure backup store.

Because the destination volume is a WORM volume, any interruption in the mirroring process may be irreparable. In the event of an interruption, the system may be required to reinitialize the mirror including transferring all stored records, i.e., a level zero transfer to a newly created destination volume.

As with other mirror processes to be described herein, the WORM nature of the source may impose limits on the reconstruction of a source from a destination (e.g. a restore process) in the event of a disaster. Since WORM files in the source WORM volume are, by definition, non-rewritable, the preferred procedure to repair the source volume is to replace it with the mirrored destination volume. Partial reconstruction of the source using the destination may be prohibited. In general, however, this is a minimal disadvantage in a synchronous mirroring approach since the destination is presumed to always contain the most up-to-date version of the source and can be easily swapped, in its entirety, for the source if necessary.

Figure 8:
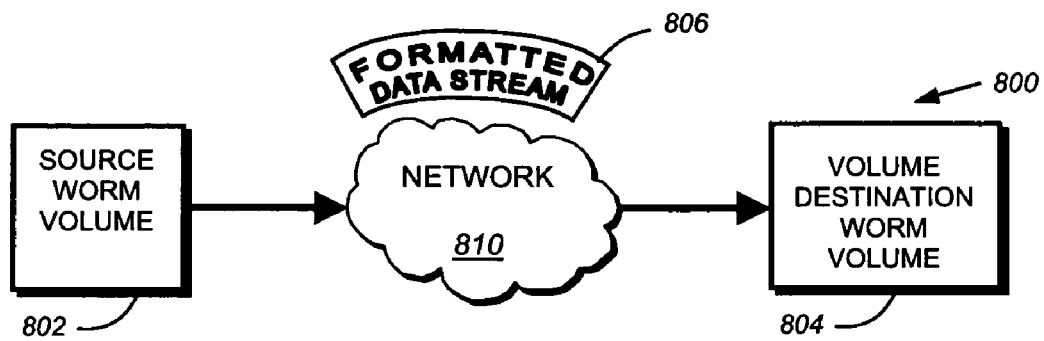
FIG. 8 is a schematic diagram of an asynchronous mirroring procedure according to an illustrative embodiment of the present invention.

FIG. 8 shows a simplified diagram of an asynchronous mirroring procedure 800. This approach is described in detail in the above-incorporated U.S. Pat. No. 6,993,539, issued on Jan. 31, 2006, entitled SYSTEM AND METHOD FORT DETERMINING CHANGES IN TWO SNAPSHOTS AND FOR TRANSMITTING CHANGES TO A DESTINATION SNAPSHOT by Michael L. Federwisch, et al., and should be referenced in conjunction with the following description.

The file system of the source volume 802 is adapted to generate time-separated point-in-time images or "snapshots" (280 in FIG. 2) of the source volume data structure or the data structures of certain sub-volumes (for example q-trees). Note that one such subvolume can be a worm (a ".worm" extension, for example) directory structure as described above. In accordance with the above-incorporated reference, the snapshots are scanned by the asynchronous snapshot mirroring application to detect changes in files based upon noted differences between snapshots taken at different times. After establishment of an appropriate WORM volume at a destination 804, the changes are transmitted in a formatted data stream 806 over a conventional (typically lower-speed) network connection 810—that may include the well-known Internet. Because of the lower-speed connection, the changes are not generally changes occurring in real-time, but are written to the destination "asynchronously" or in lazy write fashion at periodic intervals.

Figure 9:
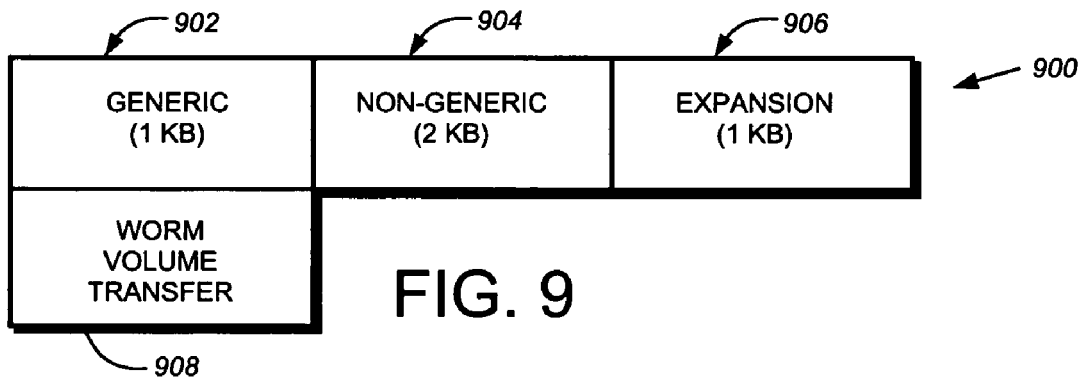
FIG. 9 is a schematic representation of a generic header for a data format used in the asynchronous mirroring procedure of FIG. 8.

In order to facilitate transfer of data from the source WORM volume 802 to the destination WORM volume in an asynchronous transfer, the data is formatted as a series of metadata (in the form of inodes in one embodiment) and associated file data. To make this data meaningful to the destination file system, it is formatted using recognizable headers that separate various portions of the data transfer (e.g. metadata versus file data) and that signal which type of data transfer is occurring. Certain headers are also provided that stand alone and include information such as deleted file lists. FIG. 9 details a simplified version of the header described in detail in the above-referenced Federwisch, et al. application. This header includes a generic part 902 of 1 KB, a non-generic part 904 of 2 KB and an expansion segment 906 of 1 KB. Added to the generic part 902 is a worm volume transfer flag 908 that signals the destination file system that WORM volume information is being transmitted in the data stream to follow. This flag is located in the "public" portion of the header so as to be recognized by open protocols.

Figure 10:
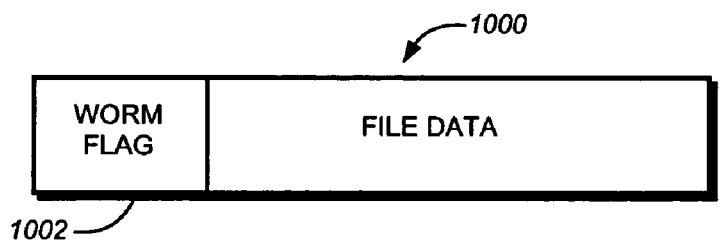
FIG. 10 is a schematic representation of a WORM flag for a data file transmitted in accordance with the asynchronous mirroring procedure of FIG. 9.

Similarly, as shown in FIG. 10, each data file 1000 in the stream contains a WORM flag bit 1002. This bit, in combination with the header information is used to reconstruct new inodes (metadata) in the destination WORM volume with an appropriate WORM state information about the file (or other data set/data container) to which the inode/metadata points. The destination file system's mirroring application is adapted to translate the encoded flags appropriately. More specific details regarding the procedure by which inodes are constructed in the destination volume are provided in the above-referenced application.

In a further embodiment, it is contemplated that security between a source and destination file server may be enhanced by employing conventional encryption and/or authentication techniques or other security-enhancing measures in order to establish a trust relationship between the source and destination. In such an implementation it is contemplated that certain restoration functions otherwise considered undesirable, may be employed with safety.

F. Setting and Employing Retention Dates

As described above with reference to WORM file creation in FIGS. 5 and 6, a retention period may be set in connection with a WORM file (or other data set/data container). This retention period basically sets a file attribute before commit of the file to WORM that causes the system to observe all WORM properties described above (no deletion, modification, etc.) for the WORM file during the applicable retention period, but after expiration of the period allows the user to perform a limited set of non-WORM actions on the now-expired WORM file. Namely, the expired WORM file may be deleted from the WORM volume, thereby freeing space for new storage.

Figure 11:
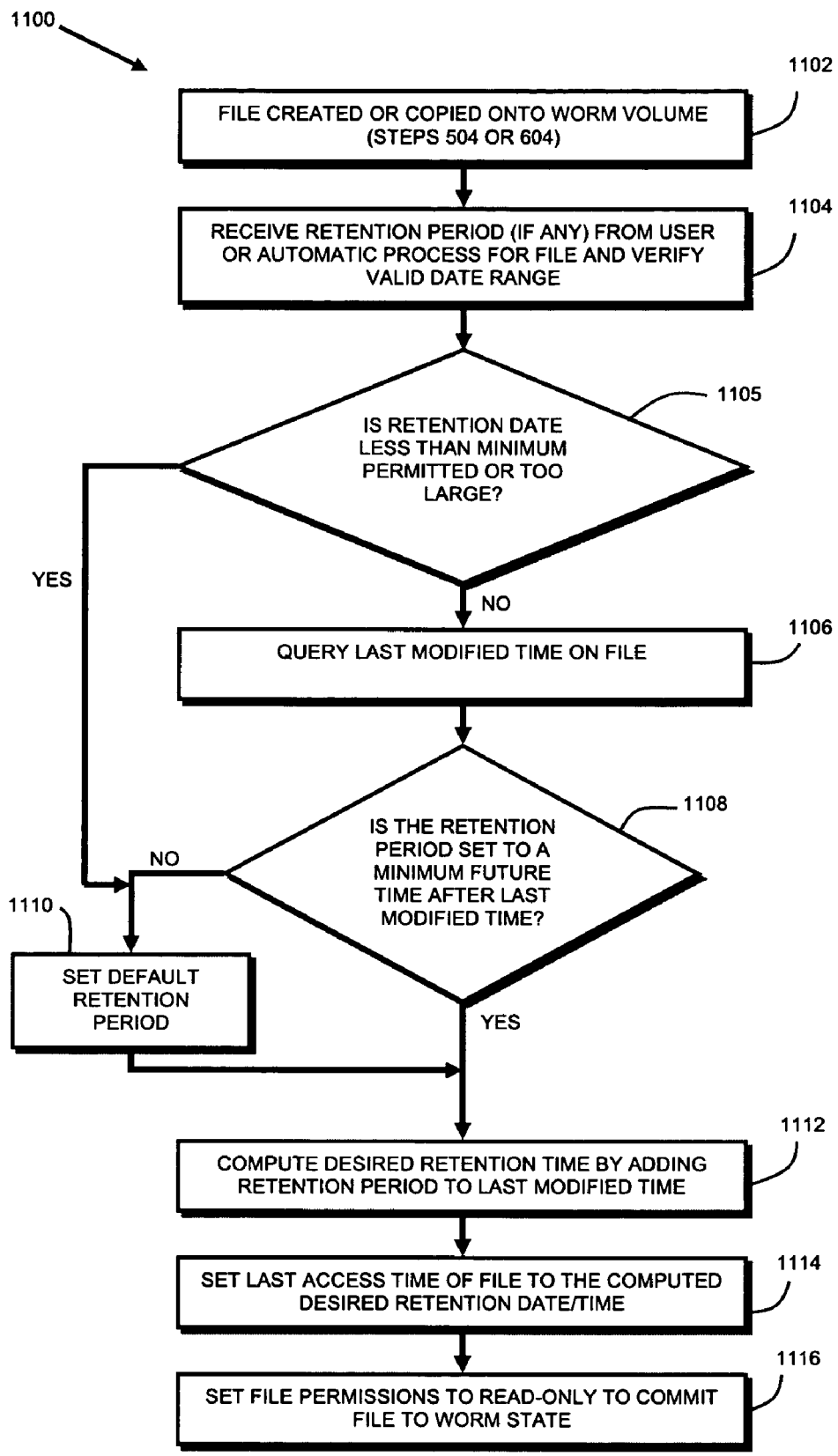
FIG. 11 is a flow diagram of a retention date/time setting procedure for WORM files according to an illustrative embodiment of this invention.

FIG. 11 shows a generalized procedure 1100 for setting retention periods (with the effective date/time after the period elapses being termed a "retention date") in connection with WORM files. A file, intended to be stored as WORM, is initially created or copied onto the worm volume (step 1102) as described generally in step 504 (for exemplary Windows® systems) and/or step 604 (for exemplary Unix® systems). Either the administrator or user interactively sets a retention date using a client-based interface or other utility as described above, or the appropriate application sets the date based upon predetermined rules (step 1104). The utility determines whether the retention period falls within an acceptable range. As described below, the period may be limited based upon the number of bits available in a given attribute. In addition, a minimum retention date may be specified. Assuming the period falls within the acceptable range, then the period is accepted (decision step 1105). Otherwise, the period may be rejected and the system returns an invalid value error code. If the user or administrator opts for no period or the period is not a valid one, this is interpreted by the utility as a default value retention period (step 1110). The nature of this default value may depend upon a variety of factors. For example, where the WORM volume is based upon an "enterprise" model with a relatively trusted administrator, the default may be set to an arbitrarily defined value, or an infinite value or zero (no retention period), as appropriate. Similarly, where the default is based upon a strict regulatory regime, there may be a minimum or infinite retention period, defined by the applicable rules and practice, assigned to the file by default. Note that, where an infinite value is defined, a particular bitcode is written in the property or attribute to signify an indefinite retention period, such as zero.

Note that in certain WORM regulatory regimes, a minimum retention date may be specified. Thus, rather than setting an infinite date, a finite minimum default retention date can be specified should no date be provided by the user. This may also depend upon the nature of the WORM volume into which the file is stored. Some volumes may be set to a regulatory or "government regulation" default setting where the system, in absence of a valid retention date, defaults to a minimum retention period. Conversely, some volumes may be set to an "enterprise" default environment wherein the administrator is trusted and the rules provide more leniency in assigning retention dates. In this instance, absence of a retention date may be presumed to assign an indefinite date or a particular finite date based upon the rules governing the particular enterprise WORM volume.

Having received a valid retention period value (or no period), the procedure 1100 queries the metadata file attributes or properties to determine the last modified time on the file (step 1106). In one embodiment, the last modified date is used as the base data from which the retention date is computed. The last modified date is fixed once the file is committed to WORM—the file cannot be modified after commit, given the recognition in a WORM volume of a read-only as a WORM. In step 1106, the queried last-modified time, prior to commit is the creation or copy time for the file. The last modified data is just one possible basis for the computation of retention date. A variety of other base time values that are considered reliable (such as a direct query of the compliance clock 279 or another trusted clock (e.g. a client clock) can be employed in alternate embodiments.

Having received a valid non-infinite retention period, the procedure then attempts to ensure that the period is sufficiently far in the future to account for clock skew and other factors that may affect the reporting of time by the compliance clock 279 (FIG. 2). According to decision step 1108, the retention period must be set to a minimum future time value following the last-modified time (for example one or two days in the future). Otherwise, the system assumes a default retention period is to be applied (step 1110).

Once a retention period is chosen (finite or infinite), the procedure 1100 computes the time value to be observed in determining the data at which the file is to be released from WORM (step 1112). This entails adding the retention period time (for example, "retain file for 10 years") to the last modified time, and thereby deriving a future release date for the file.

This computed retention date/time value is then applied to the last access time property or attribute in the file (step 1114). This attribute is also rarely, if ever, used in a WORM context, and even in a non-worm context, is not particularly critical. For example, in a Windows® environment, the majority of files are accessed each time the system is booted, making this attribute less informative for actual "access" of a given file. Accordingly, the last access time property/attribute is used by the WORM utility as the vehicle to store the critical retention date bitcode (if any).

Having applied a retention date into the last access time field, the file can now be made immutable. Accordingly the read-only attribute us set as described above, causing the WORM utility to refuse any further modifications to the file. Likewise, the file's attributes/properties including last access time are fixed. In this manner the future retention date is fixed in the last access time field, and made immutable.

Figure 12:
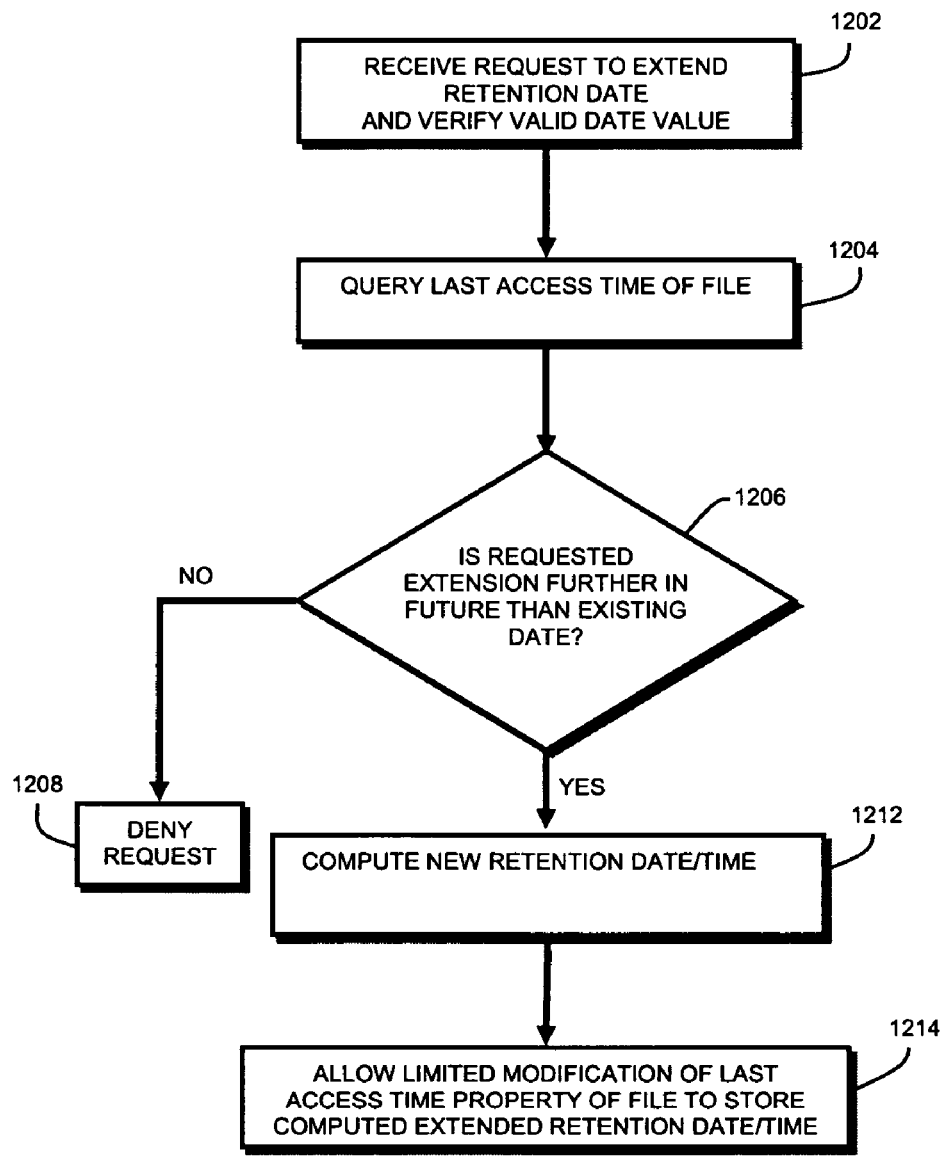
FIG. 12 is a flow diagram of a procedure for extending a retention date/time in a committed WORM file according to an illustrative embodiment of this invention.

There are circumstances in which the retention period must be extended after initially setting it. For example, if a file or record destined for expiration becomes a subject of an investigation it may need to be retained indefinitely beyond the normal expiration date. Accordingly, the WORM utility includes provision for a limited modification of the committed WORM file's properties to account for the extension of a retention period. FIG. 12 details a retention date/time extension procedure 1200. A user or administrator typically initiates a request to extend the retention period of a particular file (step 1202). As with the initial setting of the retention date, the extension period date must fall within a value that is supported by the last access time field. If so, the procedure then queries the last access time to retrieve the existing field value (step 1204).

Decision step 1206 verifies that the requested date or period is further in the future than the existing date. If not the request to extend is denied. Conversely, if the request is for an extension sufficiently far ahead in the future, then a new extended retention date/time is computed (step 1212). The computation can occur in a variety of ways. For example, the extended data can be based upon either the creation time or the last modify time where the new extended period is added to these values. Alternatively, the extended retention date can be computed by adding the last access time value (the current retention date/time) and the new extended period are added to compute the new extended retention date/time. In any of the above examples, if the extended period is infinite, then an appropriate representation for the indefinite retention period is computed. Note that once a period is made indefinite or permanent, it cannot be later reduced (per steps 1206, 1208 and 1210). Finally, in step 1214, the WORM utility overrides the normal prohibition against any modification of the subject WORM file and allows the limited overwrite of the last access time property to contain the new computed extended retention date value (or indefinite retention indicator).

As discussed herein, certain older open protocols, such as the commonly used NFSv2 and v3 use a 32-bit time format that is interpreted as seconds since Jan. 1, 1970 (e.g. "time 0"). If interpreted as an unsigned value, this expression provides a last access time up to Feb. 7, 2016. However, many operating systems interpret this time value as a signed 32-bit integer that restricts the date range to an effective 31-bit value and impose an upper bound to time values of Jan. 18, 2038. Hence, while future implementations will undoubtedly all support virtually unlimited date ranges (such as CIFS and NFSv4), current implementations must account for a somewhat limited upper bound in date ranges that may be unacceptable in the long-term storage of certain files.

Figure 13:
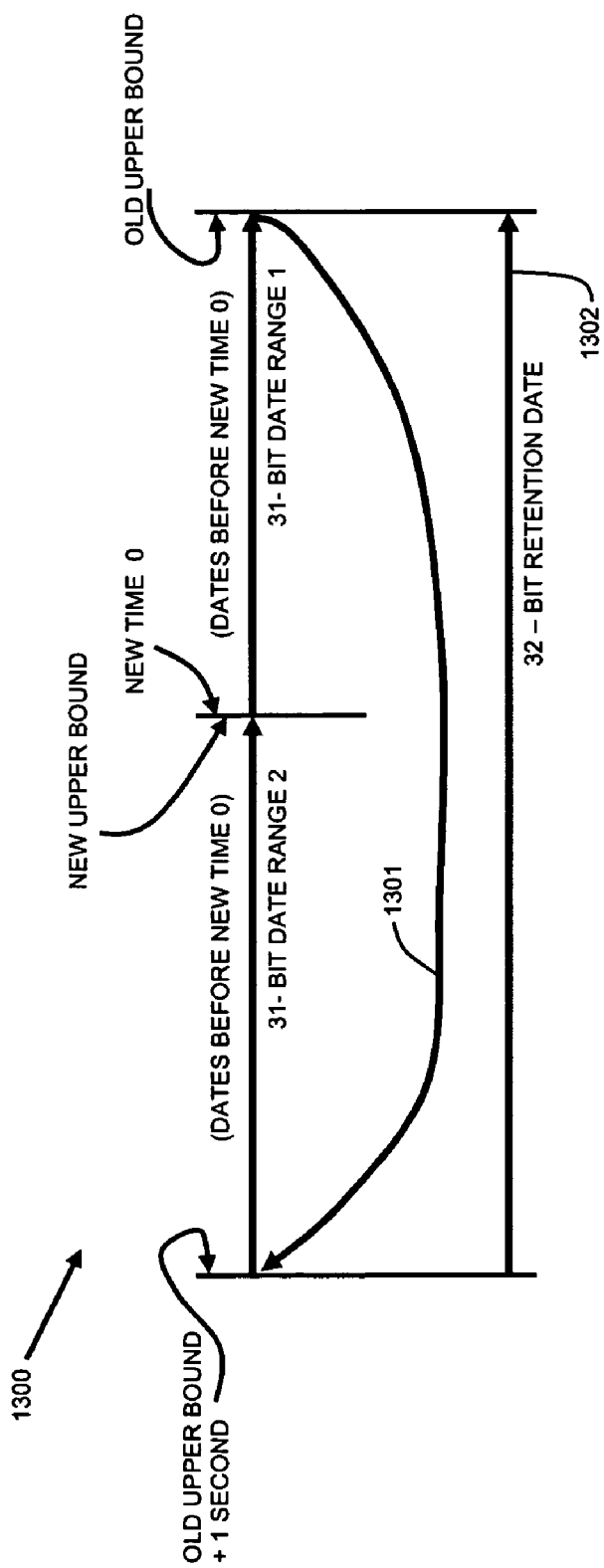
FIG. 13 is a timeline for illustrating an exemplary technique for extending the available retention date range for certain open protocols having a limited bit range for dates according to one embodiment of this invention.

Thus, in order to support an extended range for record retention dates, given the current recognition of only a 31-bit signed value, the WORM utility has been adapted to remap certain date values into an arbitrarily time-shifted regime. In this manner, the WORM utility is provided with a new, more contemporary baseline time or epoch (new time 0), of, for example, Jan. 1, 2003. However, rather than offsetting the entire time range to this new baseline, the WORM utility interprets (see timeline 1300 FIG. 13) last access times before Jan. 1, 2003 (new time zero) differently than those after Jan. 1, 2003. In this manner all retention dates falling between new time zero and Jan. 18, 2038 (old upper bound) are retained as standard values (31-bit Date Range 1). However, since any last access time value that is a time before new time zero would fall before the effective date for the WORM system, these dates are reinterpreted or wrapped around (arrow 1301)) as an upper range of dates (31-bit Date Range 2) between Jan. 18, 2038 and Jan. 1, 2071. Together, the two 31-bit date ranges (before new time 0 and after new time 0) provide an overall 32-bit retention date range 1302 to a new exemplary upper bound of Jan. 1, 2071.

Clearly, a variety of solutions to a limited bit range for time values can be employed. In addition, where sufficiently long time values can be applied to the last access attribute, a time-remapping technique is not needed.

In order to track time values so that WORM files can be released at the proper expiration date/time, a secure compliance clock 279 (FIG. 2) is provided to the storage operating system. The compliance clock interacts with various aspects of the storage operating system as well as the WORM utility to generate a time value that is reliably targeted to provide the desired retention date over a typical retention period.

Figure 14:
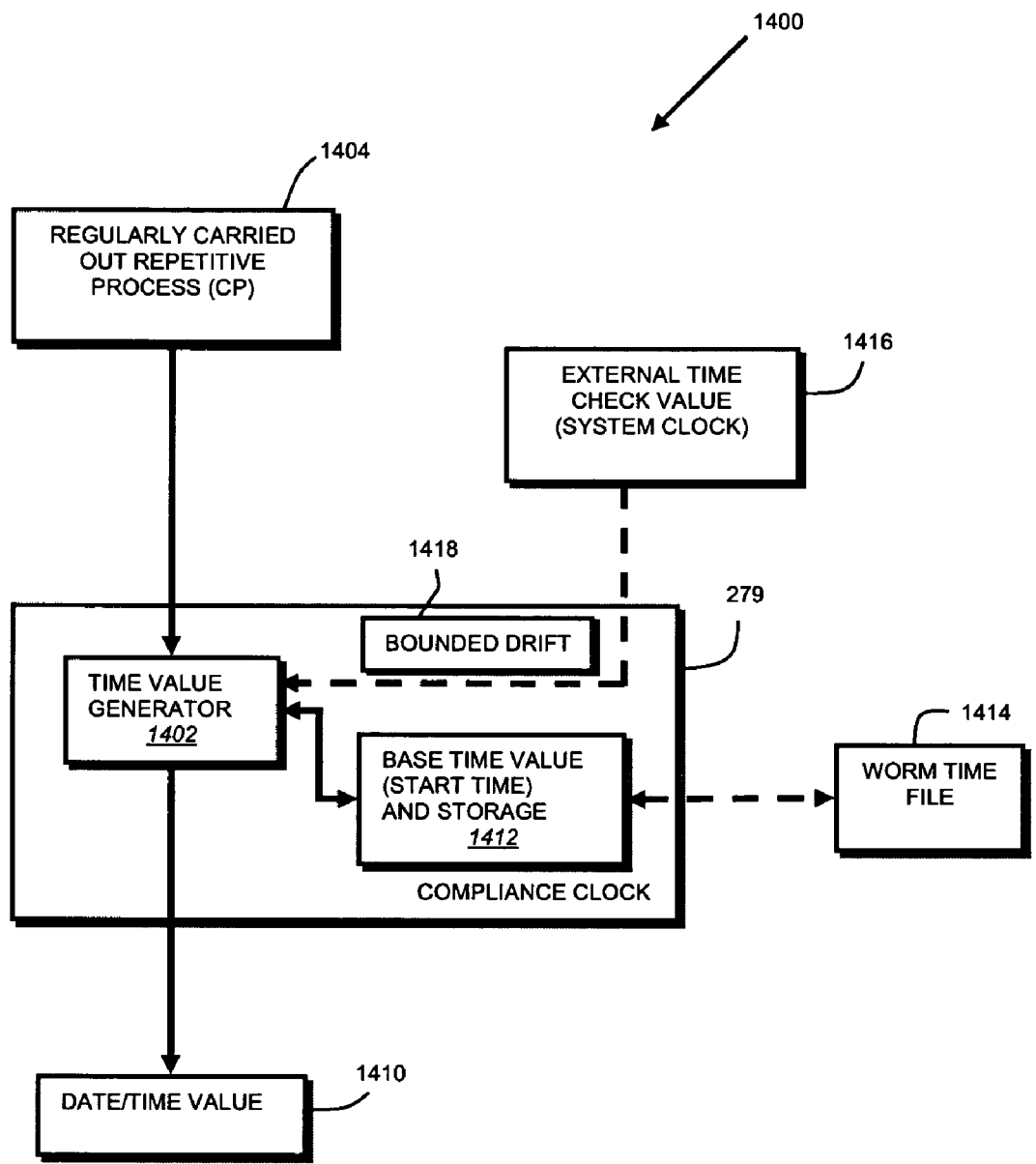
FIG. 14 is a schematic representation of an exemplary secure compliance clock for use in tracking retention dates/times according to one embodiment of this invention.

An exemplary compliance clock 279 in accordance with an illustrative embodiment is shown in FIG. 14. The clock is typically implemented as a software, rather than hardware mechanism. The clock includes a time value generator 1402 that receives a consistent pulse from a regularly-scheduled, continuous filer event 1404 such as a consistency point operation (CP). The generator 1402 has a scaling function that translates the CP or other event into a time-based value. For example, if a CP occurs every 11 seconds, the clock translates each CP into an 11-second advance in the timebase. A counter in the generator 1402 keeps a running total of events from which an ongoing date/time value 1410 is produced and output to the WORM utility and other interested components of the system. The generator receives its base time value (for example, time 0) and can store its running total time in an appropriate memory element. In practice, the time memory can be periodically committed to persistent storage using, for example, an on-disk record in, for example, an undeletable WORM file 1414 on the associated WORM volume. In general, this also means that the compliance clock travels with the WORM volume rather than the underlying filer. This file is accessed in the event of a system crash, failure, or replacement/upgrade of the filer. Thus, on boot-up of the filer, the clock file for each WORM volume is read and, as an added safety measure, the earliest clock time is selected as the value for the filer's overall compliance clock in its WORM operations. Where a new filer is deployed, that may have faster cycle time than the previous model used for the particular WORM volume, the compliance clock generator 1402 is updated to account for this change in the timebase and the elapsed time count from the file 1414 is loaded to begin the count again with the new scale still outputting the desired accurate time count.

While system downtime and other factors may cause a shift or skew in the compliance clock's reported time versus actual time (e.g. Greenwich Mean Time and Date), this shift/skew can be accounted for by interfacing the compliance clock with another clock, such as the filer's system clock. As shown in FIG. 14, the compliance clock 279 can be provided with an input from the conventional system hardware/software system clock (or another generally trusted clock) 1416 from which it can compare its reported time to the allegedly actual time. This comparison can be both on an absolute basis (e.g. current reported date/time versus system reported date/time) and based upon the relative passage of time (e.g. number of seconds elapsed for the system clock versus the compliance clock). It is assumed that in most deployments the hardware system clock will, in fact, be synchronized to a valid true time source. In order to decrease the skew of the compliance clock in relation to the hardware system clock, the compliance clock performs the described incremental counts of periodic events (CPs for example), but also "drifts" toward the hardware system clock time at a strictly bounded rate. This "bounded drifting" allows the compliance clock to track or lock onto the system hardware clock time to counteract the compounding of the clock skew over long periods of time.

The bounded drift rate 1418 ensures, even if the administrator adjusts the clock forward by, for example 10 years, in an effort to prematurely delete WORM records, that the compliance clock drifts so slowly toward this new time as to make the subversion attempt ineffective. By way of example, if an allowable drift rate of only ±1000 seconds per year is permitted (i.e. the compliance clock can "drift" by no more than 1000 seconds backward or forward during a 1-year period), then even if the system clock is (wrongly) set forward by 1 year, the compliance clock could take hundreds of years to skew by 1 year.

As a further safety measure, if the compared values of the system clock and the compliance clock are sufficiently out of synchronization, then an alert can be issued to the administrator or a supervisor/regulator. In addition all alerts can be logged to persistent/WORM storage in association with the volume and clock file. Given such an alert, appropriate action by authorities can be taken. Also, during an alert period, any deletion or modification of files could be disabled. Each of these above-described features enhances the relatively tamper-proof nature of the compliance clock according to an illustrative embodiment. Similarly, a secure hardware clock or trusted third party (for example, government-based) clock can also provide a high degree of tamper protection.

While an exemplary compliance clock has been described above, a variety of mechanisms and techniques involving external, internal or a combination of internal and external time-keeping procedures are expressly contemplated. For example, an external master clock, such as a government-based atomic clock interconnected by a network can be employed.

Figure 15:
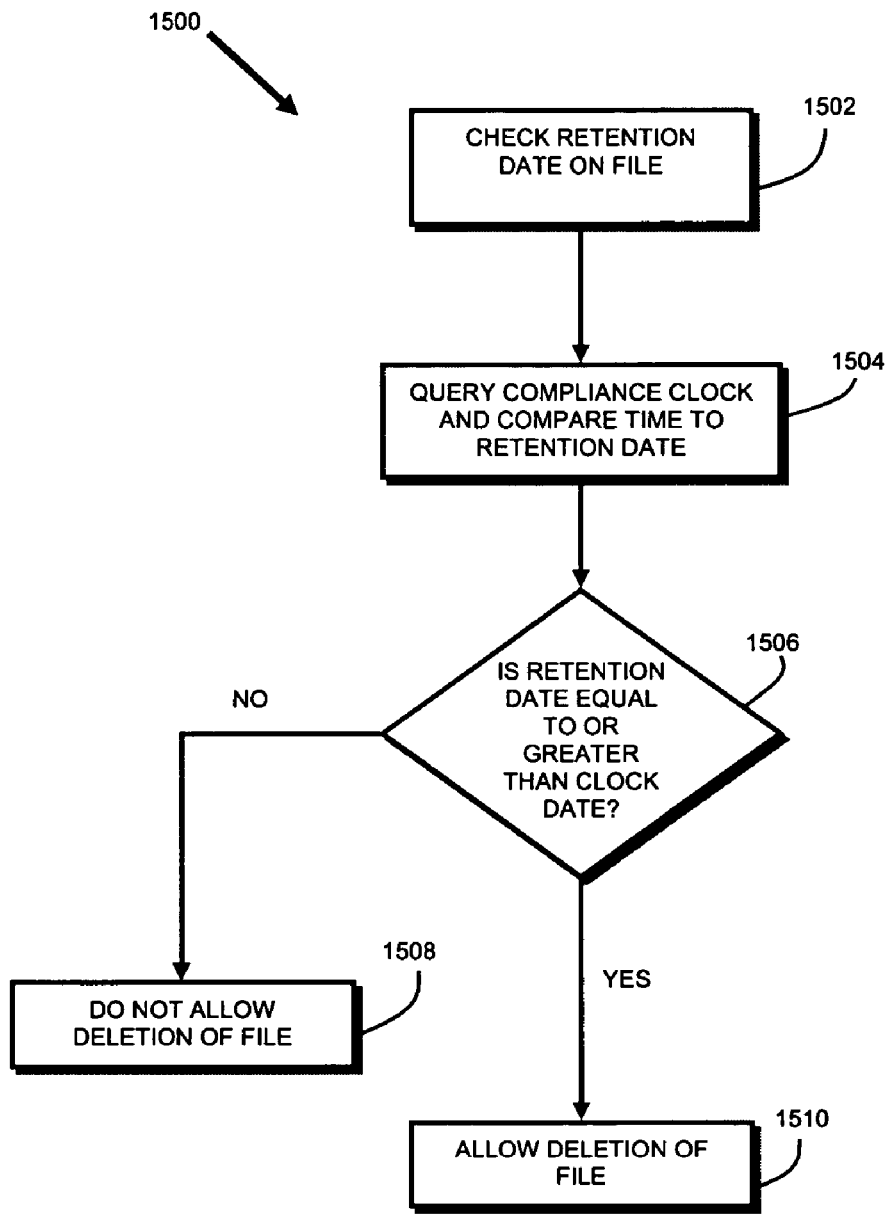
FIG. 15 is a flow diagram of a procedure for determining expiration of a retention date/time of a subject file and unlocking WORM certain restrictions on the subject file according to an illustrative embodiment of this invention.

When a client attempts to manually delete a given file, or an appropriate application daemon process sweeps the volume to find and delete files, the system must determine whether the retention date for a given file has expired and deletion thereof is permitted. FIG. 15 shows a generalized procedure for checking WORM retention dates and, when appropriate allowing limited unlocking of WORM status from an expired file.

According to step 1502, a user or administrator either requests action on a subject worm file (such as deletion), or an application daemon scans the file for possible deletion. At this point, the WORM utility queries the last access time attribute for the subject file. This is stored and the compliance clock is queried for the trusted date/time (step 1504).

According to decision step 1506, if the retention date is not greater than or equal to the clock date (or some minimum future date after the clock date for further skew protection), then the requestor is prevented from taking any action on the file (step 1508). Naturally, where an indefinite retention date is set, it is never less than the clock date and action is never permitted by the utility.

Conversely, where the retention date is less than or equal to the compliance clock date (or clock date plus a "safety" margin), then the decision step 1506 branches to step 1510, and the user or administrator is permitted to take limited action on the file, or action is automatically taken. In an illustrative embodiment, that action is typically limited only to deletion of the file from the volume, however other file-handling options may be permitted for an enterprise model WORM implementation. In this manner, other actions that may tamper with the integrity of the file while leaving it intact are still prevented. Typically the read only-attribute that committed the file to WORM is retained while, in combination with an expired date enables a return to the limited file permission of deletion. The utility thus places only a deletion permission on the expired WORM file.

As described above, a client can implement an automatic deletion of expired-retention-date files via operation of an application daemon or similar utility. In general, use of a compliance or trusted clock to provide a reliable reference to expiration of retention dates facilitates an automatic deletion process. That is, the deletion can occur in an "automatic" manner based upon periodic scans of the volume (see step 1502) to locate expired file—those with retention dates greater than or equal to the trusted clock time. To this end, a recent trusted clock time can be stored in system memory and compared to the time in each file to locate the expired ones. Alternatively, the retention date of each file can be read and then a current clock time can be retrieved and compared. Deletion can occur on each file in turn after expiration is confirmed, or all expired files can be identified by the scan and deleted thereafter in a batch process. These files are then deleted by the application using appropriate file management scripts. While the daemon describe herein typically runs on the client, it is expressly contemplated that an automatic deletion process, based upon a trusted clock can be implemented on either the client side, the file server side or both.

Note that in an alternate embodiment the WORM filer or file server described herein can be implemented as a multi-protocol storage appliance and the resident storage operating system can be implemented as a virtualization system with virtualization modules embodied as a virtual disk ("vdisk") module and a SCSI target module (not shown). The vdisk module is layered on the file system 250 to enable access by administrative interfaces, such as a streamlined user interface (UI), in response to a system administrator issuing commands to the multi-protocol storage appliance. In essence, the vdisk module manages SAN deployments by, among other things, implementing a comprehensive set of vdisk logical unit number (lun) commands issued through the UI by a system administrator. These vdisk commands are converted to primitive file system operations ("primitives") that interact with the file system 250 and the SCSI target module to implement the vdisks. This multi-protocol storage appliance arrangement is described in further detail in commonly owned U.S. Pat. No. 7,107,385, issued on Sep. 12, 2006, entitled STORAGE VIRTUALIZATION BY LAYERING VIRTUAL DISK OBJECTS ON A FILE SYSTEM, the teachings of which are expressly incorporated herein by reference. Since a lun can be represented in the storage system as a file, it is expressly contemplated that the various permissions and attributes that ascribe a WORM state to a file and allow it to have a set retention date can be applied to a lun structure.

Note that, while open protocols are typically used to implement the WORM and retention date functionalities of the illustrative embodiment, it is expressly contemplated that proprietary protocols or significantly modified versions of open protocols such as, for example, proprietary APIs can be use to implement various WORM features of this invention. For example, in an alternate embodiment, proprietary APIs can be used to implement retention dates. These can be combined with the trusted or compliance clock as described herein to ensure reliable retention and tamper-proof operation. In addition, when used in conjunction with a trusted clock as described variously herein, it is expressly contemplated that the term "storage system" can include a content addressable storage system (CAS) as described generally above. Such a trusted clock could enhance reliability and tamper-proof operation of these types storage systems.

The foregoing has been a detailed description of illustrative embodiments of the invention. Various modifications and additions can be made without departing from the spirit and scope of the invention. For example, while the retention date/ time values associated with each data container, set or file are provided within a last accessed property field in an illustrative embodiment, it is expressly contemplated that this value can be applied to any property, attribute or other data associated with the container, set or file that can be made immutable and that does not interfere with the management and handling of the container, set or file during its storage in WORM. In addition, while a file's retention date/time is set or extended according to an illustrative embodiment by querying the last modified date and adding the retention period thereto, a variety of base time values can be used to compute the retention date/time including, for example, the retrieval of a base time from the compliance clock or another trusted time source. Likewise, the internal architecture of the servers or their respective storage arrays, clients, as well as their network connectivity and protocols, are all highly variable. The operating systems used on various source and destination servers can differ. In addition, it is expressly contemplated that any of the operations and procedures described herein can be implemented using hardware, software comprising a computer-readable medium having program instructions executing on a computer, or a combination of hardware and software. Accordingly, this description is meant to be taken only by way of example and not to otherwise limit the scope of this invention.

The invention claimed is:

1. A method for implementing a retention period to a data set in a write-once-read-many (WORM) storage system, comprising:
    creating a WORM data set and saving the WORM data set to a WORM data structure, where the WORM data structure is stored across one or more rewritable storage devices;
    setting a retention period in a data of the data set that remains permanently associated with the data set; and
    committing the WORM data set to the WORM data structure after which the storage system prevents shortening of the retention period and the storage system prevents any modification to the WORM data set until after a time after expiration of the retention period.

2. The method as set forth in claim 1 wherein, after the expiration of the retention period, the storage system permits only deletion of the WORM data set from the WORM data structure and prevents any other modification to the WORM data set.

3. The method as set forth in claim 2 wherein the data into which the retention period is set is a file attribute or file property related to a time value associated with the data set.

4. The method as set forth in claim 3 wherein the file attribute or file property is a last accessed time attribute or property.

5. The method as set forth in claim 3 wherein the step of committing includes transitioning a read-only file attribute associated with the data set from a non-read-only value to a read-only value.

6. The method as set forth in claim 1 further comprising extending the retention period by adding an extension period to the retention period to derive an extended retention period and storing the extended retention period in the data into which the retention period is set.

7. The method as set forth in claim 6 wherein the step of extending includes verifying that the extension period is later in time than the retention period and rejecting an extension period that is earlier in time than the retention period.

8. The method as set forth in claim 1 further comprising comparing the retention period to a time value in a compliance clock associated with the storage system and enabling only deletion of the WORM data set after the time value is equal to or later than the retention period.

9. The method as set forth in claim 8 further comprising counting regular repetitive operations of the storage system and producing the time value based upon a count of the repetitive operations.

10. The method as set forth in claim 9 further comprising storing the time value in a time-storing WORM data set in the WORM data structure and accessing the time-storing WORM data set to restart a count of the time value after an interruption of the count.

11. The method as set forth in claim 1 wherein the storage system is configured to prevent renaming of directory paths that include the WORM data set in the worm data structure.

12. The method as set forth in claim 1 wherein the step of committing is performed by an application on a client interconnected to the storage system.

13. The method as set forth in claim 1 further comprising creating the WORM data structure at a mirror destination and transmitting and committing the created WORM data set to the destination WORM data structure.

14. The method of claim 1 wherein, after the expiration of the retention period, the storage system permits deletion of the WORM data set from the WORM data structure and prevents other modifications to the WORM data set.

15. The method of claim 1, wherein the data into which the retention period is set is a file attribute or file property related to a time value associated with the data set.

16. The method of claim 15, wherein the file attribute or file property is a last accessed time attribute or property.

17. The method of claim 15, wherein the step of committing includes transitioning a read-only file attribute associated with the data set from a non-read-only value to a read-only value.

18. A write-once-read-many (WORM) storage system having a file system comprising:
    a WORM utility residing in the file system that commits files to a designated volume based upon an open protocol file attribute provided to the file system after the file is stored in the designated volume and that provides a selectable retention period during which the file cannot be modified after being committed, wherein the designated volume is stored across one or more rewritable storage devices.

19. The WORM storage system as set forth in claim 18 wherein the open protocol file attribute comprises a read-only file attribute.

20. The WORM storage system as set forth in claim 18 wherein the file system is configured to prevent deletion of a directory containing the file.

21. The WORM storage system as set forth in claim 18 wherein the retention period is stored in an open protocol file attribute.

22. The WORM storage system as set forth in claim 21 wherein the file attribute containing the retention period comprises a last access time attribute.

23. The WORM storage system as set forth in claim 18 wherein the WORM utility is configured to compare the retention period to a time value of a compliance clock and enable predetermined modification to the file after the retention period is earlier than the time value.

24. The WORM storage system as set forth in claim 23 wherein the predetermined modification comprises only deletion of the file.

25. A computer-readable medium for implementing a retention period to a data set in a write-once-read-many (WORM) storage system, the computer-readable medium including program instructions for performing the steps of:

creating a WORM data set and saving the WORM data set to a WORM data structure, where the WORM data structure is stored across one or more rewritable storage devices;

setting a retention period in a data of the data set that remains permanently associated with the data set; and committing the WORM data set to the WORM data structure after which the storage system prevents shortening of the retention period and the storage system prevents any modification to the WORM data set until after a time after expiration of the retention period.

26. The computer-readable medium as set forth in claim 25 wherein, after the expiration of the retention period, the storage system permits only deletion of the WORM data set from the WORM data structure and prevents any other modification to the WORM data set.

27. The computer-readable medium as set forth in claim 26 wherein the data into which the retention period is set is a file attribute or file property related to a time value associated with the data set.

28. The computer-readable medium as set forth in claim 27 wherein the file attribute or file property is a last accessed time attribute or property.

29. The computer-readable medium as set forth in claim 27 wherein the step of committing includes transitioning a read-only file attribute associated with the data set from a non-read-only value to a read-only value.

30. The computer-readable medium as set forth in claim 25 further comprising extending the retention period by adding an extension period to the retention period to derive an extended retention period and storing the extended retention period in the data into which the retention period is set.

31. The computer-readable medium as set forth in claim 30 wherein the step of extending includes verifying that the extension period is later in time than the retention period and rejecting an extension period that is earlier in time than the retention period.

32. The computer-readable medium as set forth in claim 25 further comprising comparing the retention period to a time value in a compliance clock associated with the storage system and enabling only deletion of the WORM data set after the time value is equal to or later than the retention period.

33. The computer-readable medium as set forth in claim 32 further comprising counting regular repetitive operations of the storage system and producing the time value based upon a count of the repetitive operations.

34. The computer-readable medium as set forth in claim 33 further comprising storing the time value in a time-storing WORM data set and accessing the time-storing WORM data set to restart a count of the time value after an interruption of the count.

35. The computer-readable medium as set forth in claim 25 wherein the storage system is configured to prevent renaming of directory paths that include the WORM data set in the worm data structure.

36. The computer-readable medium as set forth in claim 35 wherein the step of committing is performed by an application on a client interconnected to the storage system.

37. The computer-readable medium as set forth in claim 35 further comprising creating the WORM data structure at a mirror destination and transmitting and committing the created WORM data set to the destination WORM data structure.

38. A method, comprising:

establishing a write-once-read-many (WORM) volume in a storage system where the WORM volume stores one or more data sets, wherein each data set is locked against modification until expiration of a respective retention date;

identifying a type of WORM volume as at least one of either an untrusted administrator WORM volume or a trusted-administrator WORM volume, where the untrusted administrator WORM volume and the trusted-administrator WORM volume are each stored across one or more rewritable storage devices; and allowing only untrusted administrator activities to be performed on each of the predetermined of the data sets in an untrusted administrator WORM volume and allowing trusted administrator activities to be performed on each of the predetermined of the data sets in a trusted administrator WORM volume.

39. The method as set forth in claim 38 wherein the step of allowing untrusted administrator activities include only allowing deletion of each of the data sets after the respective retention date has expired and providing a default minimum retention date to each of the data sets.

40. The method as set forth in claim 39 wherein the step of allowing trusted administrator activities includes providing a default retention date that enables immediate modification to each of the data sets.

41. The method as set forth in claim 39 wherein the step of allowing trusted administrator activities includes enabling deletion of each of the data sets and other modification to each of the data sets after the respective retention date has expired.

42. The method as set forth in claim 39 wherein the step of allowing trusted administrator activities includes enabling destruction of the trusted administrator volume.

43. A method, comprising:

creating a write once read many (WORM) data set and saving the WORM data set to a WORM volume, where the WORM volume is stored across one or more rewritable storage devices;

setting a retention period in a field of a data, where the data remains permanently associated with the WORM data set; and committing the WORM data set to the WORM volume after which a storage system prevents modification to the WORM data set until after a time after expiration of the retention period.

44. The method of claim 43, further comprising:

extending the retention period by adding an extension period to the retention period to derive an extended retention period and storing the extended retention period in the data into which the retention period is set.

45. The method of claim 44, wherein the step of extending includes verifying that the extension period is later in time than the retention period and rejecting an extension period that is earlier in time than the retention period.

46. The method of claim 43, further comprising:

comparing the retention period to a time value in a compliance clock associated with the storage system and enabling only deletion of the WORM data set after the time value is equal to or later than the retention period.

47. The method of claim 46, further comprising:

counting regular repetitive operations of the storage system and producing the time value based upon a count of the repetitive operations.

48. The method of claim 47, further comprising:

storing the time value in a time-storing WORM data set in the WORM data structure and accessing the time-storing WORM data set to restart a count of the time value after an interruption of the count.

49. The method of claim 43, wherein the storage system is configured to prevent renaming of directory paths that include the WORM data set in the WORM volume.

50. The method of claim 43, wherein the step of committing is performed by an application on a client interconnected to the storage system.

51. The method of claim 43, further comprising:
creating the WORM data structure at a mirror destination and transmitting and committing the created WORM data set to the destination WORM data structure.

52. The method of claim 43, wherein the data is metadata associated with the WORM data set.

53. An apparatus, comprising:
means for creating a write once read many (WORM) data set and saving the WORM data set to a WORM volume, where the WORM volume is stored across one or more rewritable storage devices;
means for setting a retention period in a field of a data, where the data remains permanently associated with the WORM data set; and
means for committing the WORM data set to the WORM volume after which a storage system prevents modification to the WORM data set until after a time after expiration of the retention period.

54. An apparatus, comprising:
a write once read many (WORM) utility residing in a storage system that commits one or more data sets to a designated volume based upon an open protocol file attribute provided to the storage system after each data set is stored in the designated volume and that provides a selectable retention period during which each data set cannot be modified after being committed, where the designated volume is stored across one or more rewritable storage devices.

55. A method, comprising:
creating a write once read many (WORM) data set and saving the WORM data set to a group of WORM data containers, where the WORM data containers are rewritable storage devices;
setting a retention period in a field of a data, where the data remains permanently associated with the WORM data set; and
committing the WORM data set to the group of WORM data containers after which a storage system prevents modification to the WORM data set until after a time after expiration of the retention period.

56. A method, comprising:
marking an attribute in persistent storage of one or more rewritable disks to identify each disk for write once read many (WORM) storage;
creating a WORM volume using the one or more rewritable disks marked for WORM storage;
creating a WORM data set and saving the WORM data set to the WORM volume;
setting a retention period in a field of metadata, where the metadata remains permanently associated with the WORM data set; and
committing the WORM data set to the WORM volume, which prevents the storage system from shortening the retention period and any modification to the WORM data set until after a time after expiration of the retention period.

57. The method of claim 56, further comprising:
determining the retention period has expired; and
in response to the retention period expiring, deleting the WORM data set.

58. The method of claim 57, wherein the step of determining further comprises:
comparing the retention period to a time value in a compliance clock associated with the storage system and enabling only deletion of the WORM data set after the time value is equal to or later than the retention period.

59. The method of claim 57, further comprising:
in response to the retention period expiring, preventing other modifications to the WORM data set other then deletion.

60. The method of claim 56, wherein the metadata into which the retention period is set is a file attribute or file property related to a time value associated with the WORM data set.

61. The method of claim 60, wherein the file attribute or file property is a last accessed time attribute or property.

62. The method of claim 56, wherein the step of committing includes transitioning a read-only file attribute associated with the WORM data set from a non-read-only value to a read-only value.

63. A storage system, comprising:
one or more rewritable disks, wherein each rewritable disk has a write once read many (WORM) attribute marked in persistent storage to identify each disk for WORM storage;
a WORM volume using the one or more rewritable disks marked for WORM storage;
a WORM utility residing in a file system to create a WORM data set and to save the WORM data set to the WORM volume;
a retention period stored in a field of metadata, where the metadata remains permanently associated with the WORM data set; and
the WORM utility further configured to commit the WORM data set to the WORM volume, which prevents the storage system from shortening the retention period and any modification to the WORM data set until after a time after expiration of the retention period.

64. The system of claim 63, wherein the metadata into which the retention period is set is a file attribute or file property related to a time value associated with the WORM data set.

65. The system of claim 64, wherein the file attribute or file property is a last accessed time attribute or property.

66. The system of claim 63, wherein the WORM utility is further configured to commit the WORM data set to the WORM volume further comprises the WORM utility transitioning a read-only file attribute associated with the WORM data set from a non-read-only value to a read-only value.

67. A computer-readable medium for implementing a retention period to a data set in a write-once-read-many (WORM) storage system, the computer-readable medium including program instructions for performing the steps of:
marking an attribute in persistent storage of one or more rewritable disks to identify each disk for WORM storage;
creating a WORM volume using the one or more rewritable disks marked for WORM storage;
creating a WORM data set and saving the WORM data set to the WORM volume;
setting the retention period in a field of metadata, where the metadata remains permanently associated with the WORM data set; and
committing the WORM data set to the WORM volume, which prevents the storage system from shortening the retention period and any modification to the WORM data set until after a time after expiration of the retention period.

68. An apparatus, comprising:

means for marking an attribute in persistent storage of one or more rewritable disks to identify each disk for write once read many (WORM) storage;

means for creating a WORM volume using the one or more rewritable disks marked for WORM storage;

means for creating a WORM data set and saving the WORM data set to the WORM volume;

means for setting a retention period in a field of metadata, where the metadata remains permanently associated with the WORM data set; and means for committing the WORM data set to the WORM volume, which prevents the storage system from shortening the retention period and any modification to the WORM data set until after a time after expiration of the retention period.

69. A method for implementing a retention period to a data set in a write-once-read-many (WORM) storage system, comprising:

creating a WORM data set and saving the WORM data set to a WORM data structure, where the WORM data structure is stored across one or more rewritable storage devices;

setting a retention period in a data of the data set that remains permanently associated with the data set until expiration of the retention period; and committing the WORM data set to the WORM data structure after which the storage system prevents shortening of the retention period and the storage system prevents any modification to the WORM data set until after a time after expiration of the retention period.

* * * * *